(12) United States Patent
Fukunaga et al.

(10) Patent No.: US 6,683,988 B1
(45) Date of Patent: Jan. 27, 2004

(54) PICTURE TRANSMISSION SYSTEM USING MINIMAL REFERENCE-FRAME MODIFICATION TO RECOVER FROM TRANSMISSION ERRORS

(75) Inventors: Shigeru Fukunaga, Tokyo (JP); Toshihisa Nakai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/412,322

(22) Filed: Oct. 5, 1999

(30) Foreign Application Priority Data

Oct. 8, 1998 (JP) .......................... 10-286631

(51) Int. Cl.[7] .............................. G06K 9/36; H04N 7/12
(52) U.S. Cl. .................................. 382/236; 375/240.27
(58) Field of Search ............................. 382/254, 232, 382/233, 236; 348/416.1, 407.1; 714/746, 747–753; 375/240, 240.12, 240.16, 240.27

(56) References Cited

U.S. PATENT DOCUMENTS

| | | | | | |
|---|---|---|---|---|---|
| 5,420,872 A | * | 5/1995 | Hyodo et al. | ................ | 714/747 |
| 6,035,069 A | * | 3/2000 | Nagai et al. | ................ | 382/233 |
| 6,081,296 A | * | 6/2000 | Fukunaga et al. | ..... | 375/240.12 |
| 6,111,915 A | * | 8/2000 | Fukunaga et al. | ..... | 375/240.12 |
| 6,144,769 A | * | 11/2000 | Sato et al. | .................. | 382/236 |
| 6,456,664 B1 | * | 9/2002 | Matsumura et al. | ... | 375/240.27 |
| 6,489,996 B1 | * | 12/2002 | Matsumura et al. | ..... | 348/416.1 |

OTHER PUBLICATIONS

"Video Coding for Low Bitrate Communication" *International Telecommunication Union*; Telecommunication Standardization Sector of ITU; Draft H.263; Dec. 5, 1995.

* cited by examiner

*Primary Examiner*—Yon J. Couso
(74) *Attorney, Agent, or Firm*—Rabin & Berdo, P.C.

(57) ABSTRACT

In a picture transmission system that transmits a series of pictures from a coding apparatus to a decoding apparatus, each picture being coded and decoded with reference to a preceding picture, when a transmission error occurs, the decoding apparatus detects a decoding error caused by the transmission error and sends an error signal to the coding apparatus. The coding apparatus and decoding apparatus then both modify part of a reference picture affected by the decoding error, making identical modifications. A subsequent picture is coded and decoded with reference to the modified reference picture, thereby recovering from the transmission error with minimum loss of coding efficiency and picture quality.

57 Claims, 21 Drawing Sheets

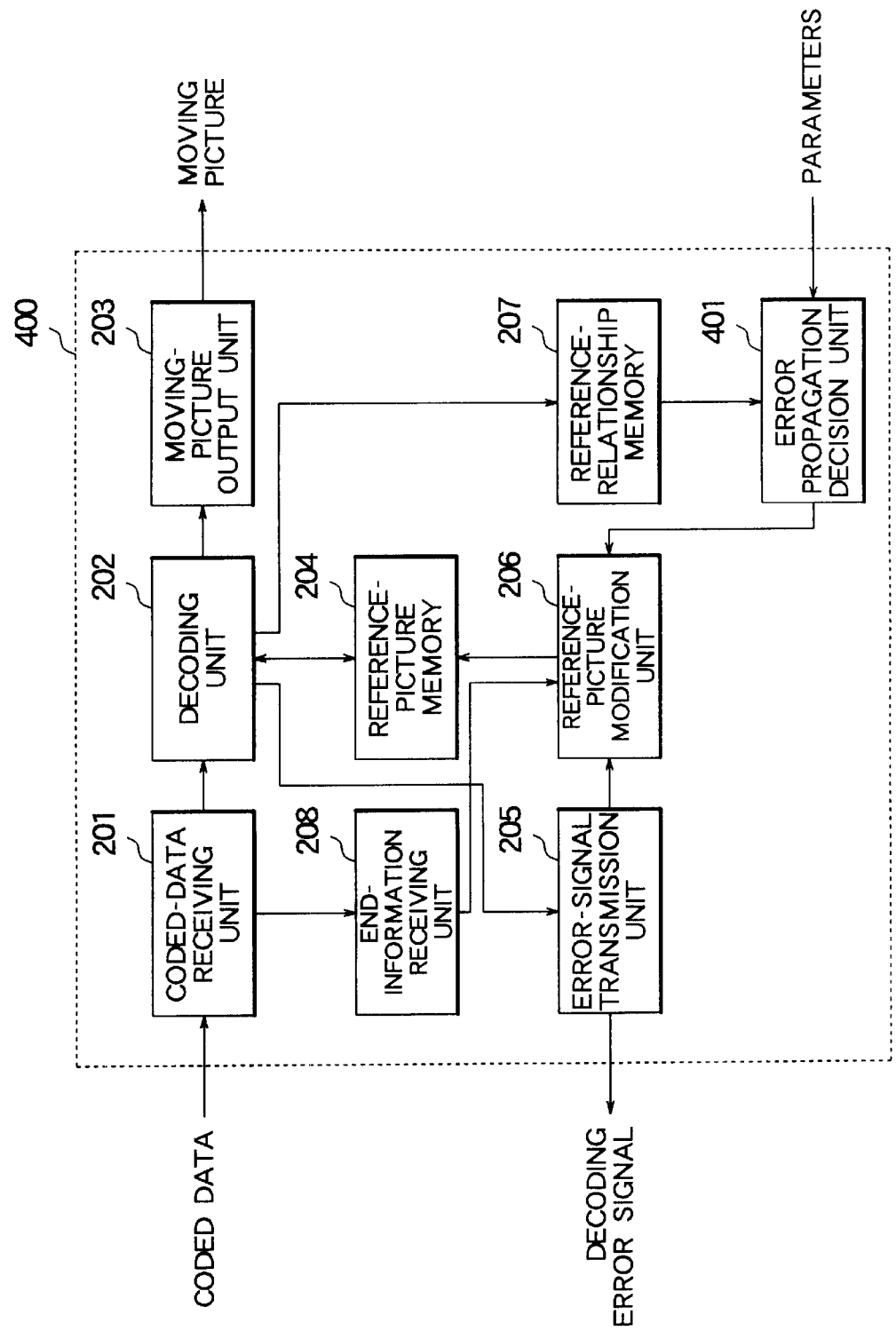

ERROR

ERROR PROPAGATION

PICTURE TRANSMISSION SYSTEM USING MINIMAL REFERENCE-FRAME MODIFICATION TO RECOVER FROM TRANSMISSION ERRORS

BACKGROUND OF THE INVENTION

The present invention relates to a picture transmission system that transmits digitized pictures coded by inter-frame coding.

Systems that transmit digitized moving pictures over communication networks, including videophone systems, videoconferencing systems, and video-on-demand (VOD) systems, are becoming increasingly common, and work is proceeding on the international standardization of methods of coding the moving pictures. Coding methods can be classified as intra-frame methods, which reduce spatial redundancy within an individual picture or frame, and inter-frame methods, which also reduce temporal redundancy from frame to frame. One inter-frame coding method is described in recommendation H.263 of the Telecommunication Standardization Sector of the International Telecommunication Union (ITU-T). Another is described in the phase-two standard of the Moving Picture Experts Group (MPEG-2), which has been adopted by the International Standards Organization (ISO). An example of a system that uses only intra-frame coding is a system using the still-picture coding method of the Joint Photographic Experts Group (JPEG). JPEG coding, which is also an ISO standard, can be used to code each frame of a moving picture, creating what is called a JPEG movie.

Inter-frame coding is much more efficient than intra-frame coding. On a typical transmission channel with limited bandwidth, inter-frame coding can provide smoother motion and higher picture quality than can intra-frame coding, as long as no transmission errors occur. When a transmission error occurs, however, inter-frame coding causes the effect of the error to propagate from frame to frame, which can lead to persistent and serious picture degradation.

Transmission errors are, unfortunately, quite common in communication systems. They are particularly common in wireless communication systems. They also occur in packet transmission networks, such as local area networks employing the asynchronous transmission mode (ATM), which can lose data due to packet collisions or overflow of buffers.

A simple method of dealing with transmission errors is to retransmit the erroneous or missing data, but this method is generally too slow for moving-picture transmission systems, which must operate in real time.

Another method is to employ a powerful error-correcting code, with sufficient redundancy to make most errors correctable at the receiving end. The redundant bits use up bandwidth, however, so the picture data must be compressed to a greater degree in compensation. The higher compression ratio entails a sacrifice of picture quality, even when no transmission errors occur. Furthermore, no error-correcting code can correct all transmission errors. Severe burst errors and errors caused by packet loss generally remain uncorrectable.

For these reasons, systems employing inter-frame coding usually refresh the picture by inserting frames coded by intra-frame coding (intra-frames) from time to time. Intra-frames may be inserted at regular intervals, a practice known as cyclic refresh, or in response to signals from the receiving terminal, a practice known as refresh on demand.

A problem is that since intra-frame coding is less efficient, a certain amount of picture quality must be sacrificed each time an intra-frame is transmitted. If intra-frames are inserted frequently, the attendant loss of picture quality can become quite noticeable, the extreme case being a JPEG movie. If intra-frames are transmitted infrequently, however, there may be an undesirably long delay before picture degradation caused by a transmission error is corrected.

For reference, FIG. 1 shows a simple example of a moving picture transmitted with inter-frame and intra-frame coding. Frames 1 and 10 (hatched) are intra-frames, also referred to as I-frames. The other frames 2, 3, 4, 5, 6, 7, 8, 9, 11, 12 are inter-frames, also referred to as predicted frames or P-frames. Each P-frame is coded with reference to the immediately preceding frame, as indicated by the arrows.

FIG. 2 illustrates the effect of a transmission error in frame 6 of this series of frames. Frame 6 cannot be decoded correctly, because of the error; frame 7 cannot be decoded correctly, because it was coded with reference to frame 6; frame 8 cannot be decoded correctly, because it was coded with reference to frame 7; and frame 9 cannot be decoded correctly, because it was coded with reference to frame 8. The result of this error propagation is that the picture is degraded in four consecutive frames, the correct picture not being recovered until the next intra-frame is transmitted, at frame 10.

FIG. 3 shows a JPEG movie, in which every frame is coded by intra-frame coding. Transmission errors do not propagate from frame to frame, but the inefficiency of JPEG coding precludes the transmission of a high-quality picture at a smooth-motion frame rate within practical bandwidth limits.

SUMMARY OF THE INVENTION

An object of the present invention is to recover from picture transmission errors quickly, with minimal loss of picture quality.

In a picture transmission system that transmits a series of pictures from a coding apparatus to a decoding apparatus, each picture in the series being coded and decoded with reference to a preceding picture in the series, the invention provides a transmission-error recovery method comprising the following steps:

detecting a decoding error caused by the transmission error;

transmitting an error signal from the decoding apparatus to the coding apparatus;

selecting a reference picture;

determining a part of the reference picture made undecodable by the decoding error;

modifying this part of the reference picture in the coding apparatus;

identically modifying the same part of the same reference picture in the decoding apparatus;

coding a subsequent picture with reference to the modified reference picture; and decoding the subsequent picture with reference to the modified reference picture.

The invented method is quick, because it does not wait for intra-frame coding to take place.

The reference picture is modified as little as necessary, so high coding efficiency is maintained. Consequently, high picture quality is maintained.

The invention also provides a coding apparatus and a decoding apparatus employing the invented method.

BRIEF DESCRIPTION OF THE DRAWINGS

In the attached drawings:

FIG. 9 is a block diagram of the decoding apparatus in the second embodiment;

DETAILED DESCRIPTION OF THE INVENTION

Figure 1:
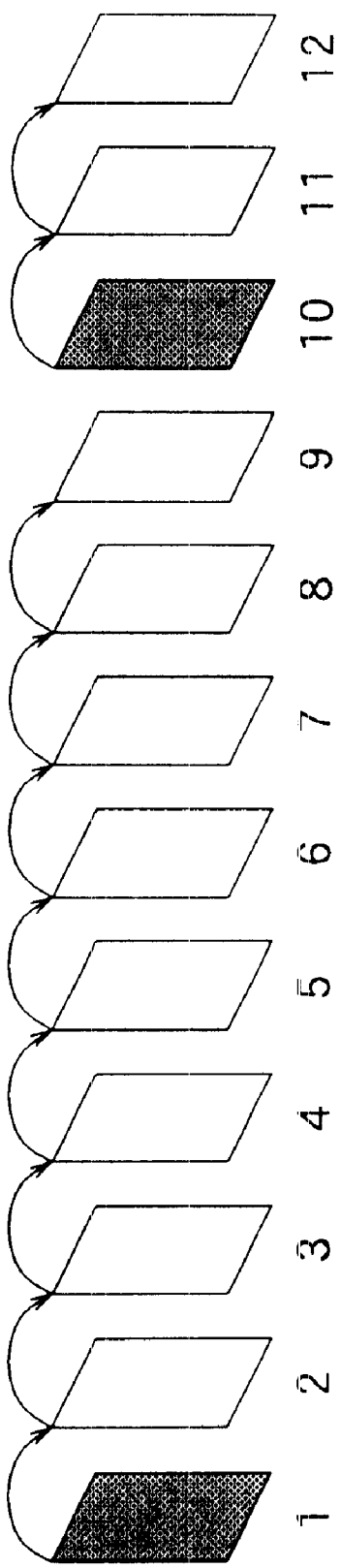
FIG. 1 illustrates conventional transmission of a moving picture with inter-frame and intra-frame coding.
Figure 2:
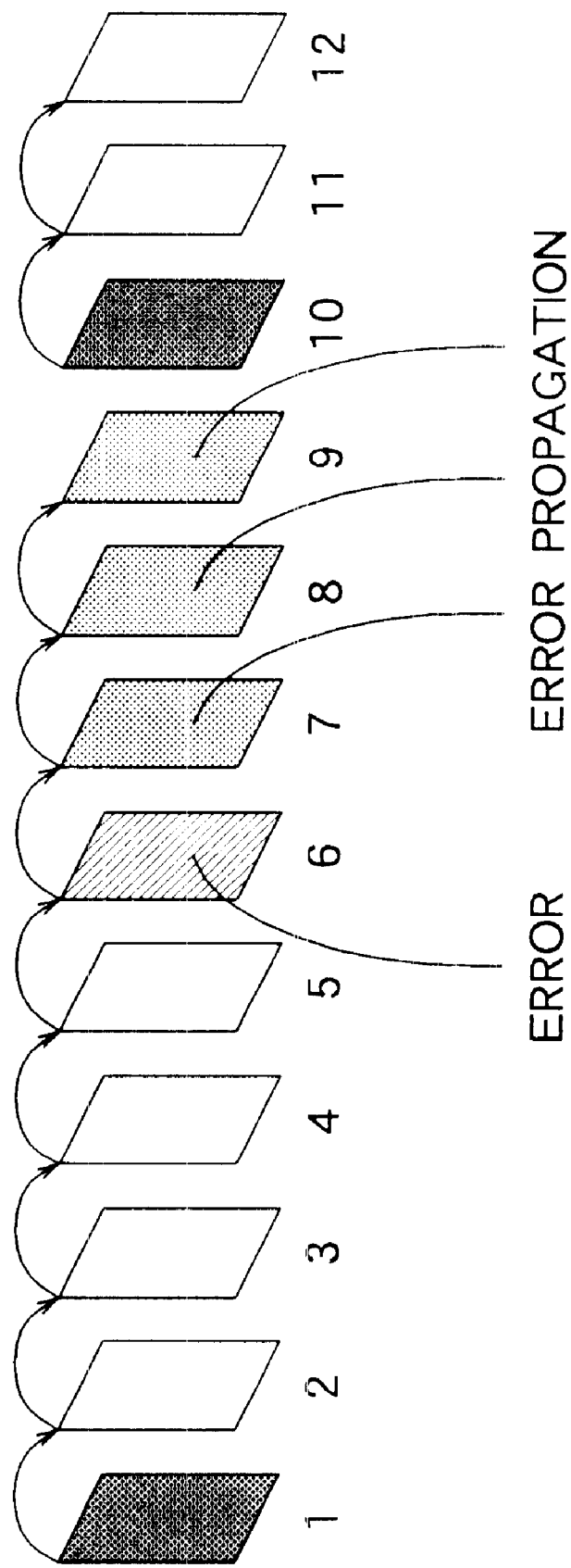
FIG. 2 illustrates the effect of a transmission error in FIG. 1.
Figure 3:
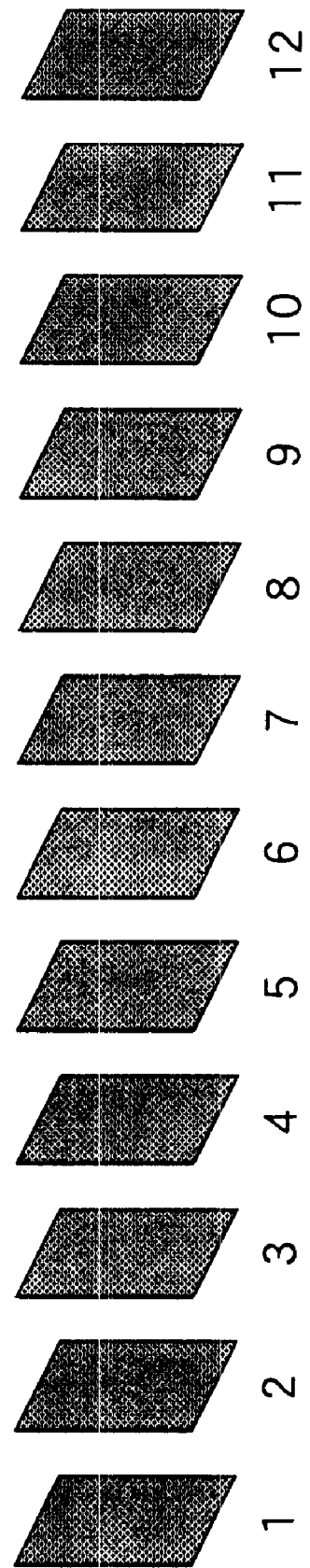
FIG. 3 illustrates a JPEG movie.

Embodiments of the invention will be described with reference to the attached drawings, in which like parts are indicated by like reference characters.

The embodiments will show moving-picture transmission systems of the general type described in the H.263 and MPEG-2 standards. These systems divide each frame of a moving picture into blocks, detect motion, and perform motion compensation by coding each block with reference to a part of the preceding frame that may be in a slightly different location from the block being coded. The positional relationship is indicated by a motion vector. Individual frames may occasionally be coded by intra-frame coding, as illustrated in FIG. 1, or individual blocks in a frame may occasionally be coded by intra-frame coding, as the need arises, but the use of intra-frame coding is preferably minimized. The blocks mentioned in the embodiments may be referred to as macroblocks in actual applications.

1st Embodiment

The first embodiment is a moving-picture transmission system in which the coding apparatus both codes and decodes each frame, transmits each coded frame to the decoding apparatus, and stores a plurality of most recently decoded frames. Upon receiving an error signal from the decoding apparatus, the coding apparatus modifies its stored decoded data, working forward from the frame in which the error occurred to the most recent frame, replacing all data that the decoding apparatus may have been unable to decode with data unaffected by the error. The coding apparatus then notifies the decoding apparatus that the modification has been completed. Meanwhile, the decoding apparatus makes similar replacements, so that when the modification is complete, the coding apparatus and decoding apparatus have identical reference frames from which to continue coding and decoding.

Figure 4:
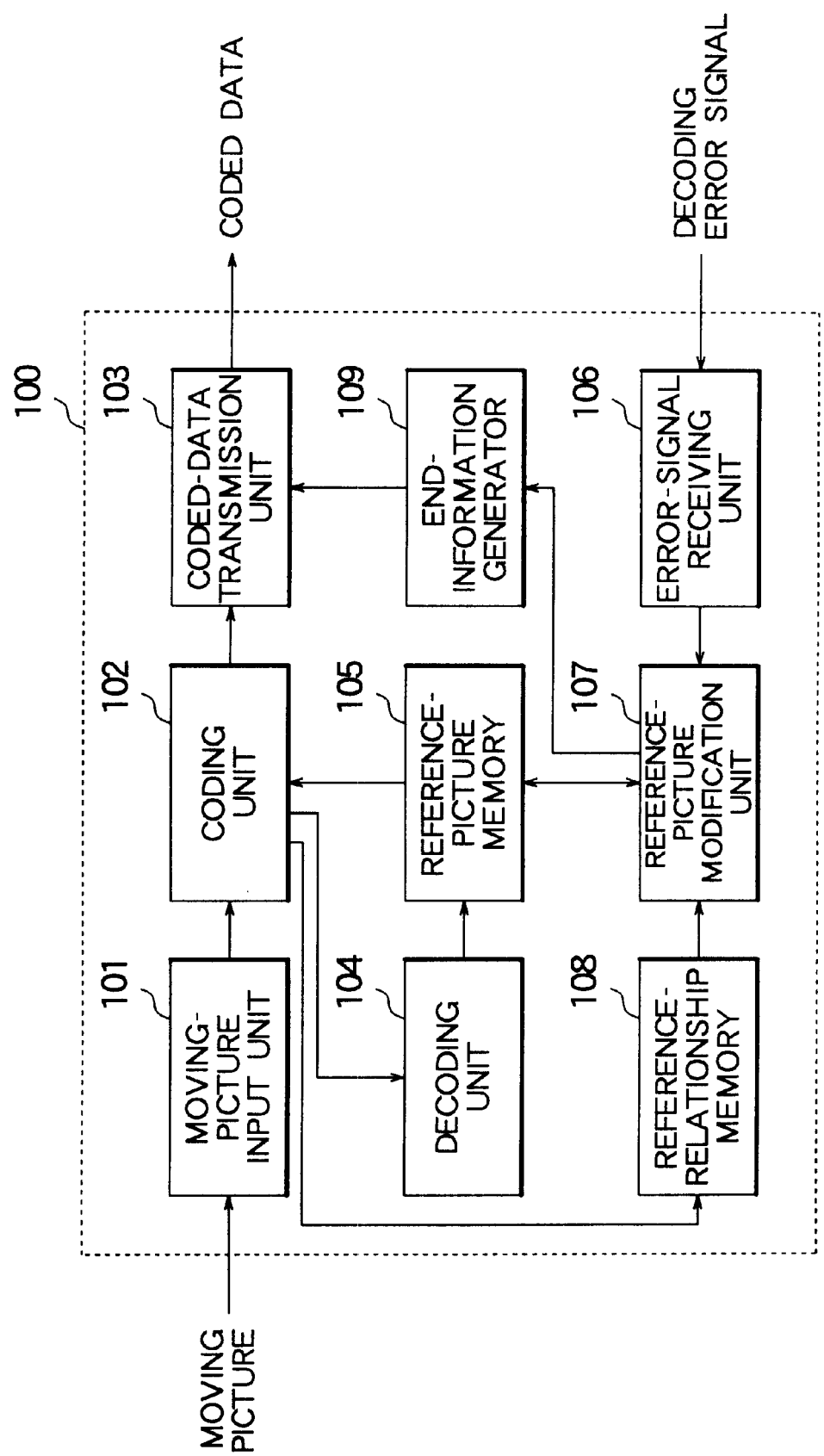
FIG. 4 is a block diagram of the coding apparatus in a first embodiment of the invention.

Referring to FIG. 4, the coding apparatus 100 in the first embodiment comprises a moving-picture input unit 101, a coding unit 102, a coded-data transmission unit 103, a decoding unit 104, a reference-picture memory 105, an error-signal receiving unit 106, a reference-picture modification unit 107, a reference-relationship memory 108, and an end-information generator 109.

The moving-picture input unit 101 receives moving-picture data from a device such as a video camera, and supplies the received data to the coding unit 102, one frame at a time.

The coding unit 102 divides each frame into a plurality of blocks, codes the blocks, and supplies the coded data to the coded-data transmission unit 103 and decoding unit 104. The coding unit 102 can code each frame, or each block, by either intra-frame or inter-frame coding. In inter-frame coding, the coding unit 102 codes a block with reference to the corresponding block and/or one or more neighboring blocks in the immediately preceding frame, which is stored in the reference-picture memory 105. For each block in the current frame, the coding unit 102 informs the reference-relationship memory 108 which blocks in the preceding frame were used as reference blocks, by providing the reference-relationship memory 108 with a motion vector or equivalent information.

The coded-data transmission unit 103 transmits the coded moving-picture data to the decoding apparatus. The transmitted data include frame numbers and block numbers identifying each coded block. When a reference-frame modification operation has been completed, the transmitted data also include end-of-modification information supplied by the end-information generator 109. The coded-data transmission unit 103 may also multiplex address information identifying the transmitting and receiving terminals, and other information, as necessary, into the transmitted bit stream.

The decoding unit 104 decodes the coded data output from the coding unit 102, and writes the decoded picture data, together with frame numbers and block numbers, in the reference-picture memory 105.

The reference-picture memory 105 stores a plurality of decoded frames. The most recent frame is read by the coding unit 102 as a reference frame, and remains stored in the reference-picture memory 105 until being deleted to make room for a new frame. The number of frames stored in the reference-picture memory 105 is sufficient to assure that when a decoding error signal is received, the frame in which the error occurred will still be stored in the reference-picture memory 105.

The error-signal receiving unit 106 receives decoding error signals from the decoding apparatus. Each decoding error signal specifies a frame number, and one or more blocks in the specified frame that could not be decoded correctly. The error-signal receiving unit 106 supplies the specified frame number and block numbers to the reference-picture modification unit 107.

When the reference-picture modification unit 107 receives a frame number (denoted N below) and one or more block numbers from the error-signal receiving unit 106, it modifies the data for the designated frame (frame N) and subsequent frames stored in the reference-picture memory 105. First, it replaces each designated block in frame N with the corresponding block from the preceding frame (frame N−1). The replaced blocks will be referred to below as error blocks, even though the data written by the decoding unit 104 in the reference-picture memory 105 were of course not erroneous. In the next frame (frame N+1), each block which was coded with reference to one of the error blocks in frame N, as indicated by information read from the reference-relationship memory 108, is replaced with picture data from the modified frame N. These replaced blocks will be referred to below as error propagation blocks. Similar replacements of error propagation blocks are then carried out in sequence up to the most recent frame stored in the reference-picture memory 105. Upon completing these modifications of the frame data, the reference-picture modification unit 107 notifies the end-information generator 109.

The reference-relationship memory 108 stores the information received from the coding unit 102, indicating which blocks in the preceding frame were used as reference blocks for coding each block in the current frame, and retains this information for a plurality of frames.

Upon being notified of the completion of a modification operation by the reference-picture modification unit 107, the end-information generator 109 obtains the frame number of the frame that contained the error for which the modification was performed. This frame number, which is the same as the frame number in the decoding error signal, can be obtained from the reference-picture modification unit 107, or from the error-signal receiving unit 106, or by subtracting the number of modified frames from the current frame number. The end-information generator 109 passes this frame number to the coded-data transmission unit 103, together with an instruction to transmit end-of-modification information. The frame number is included in the end-of-modification information.

Figure 5:
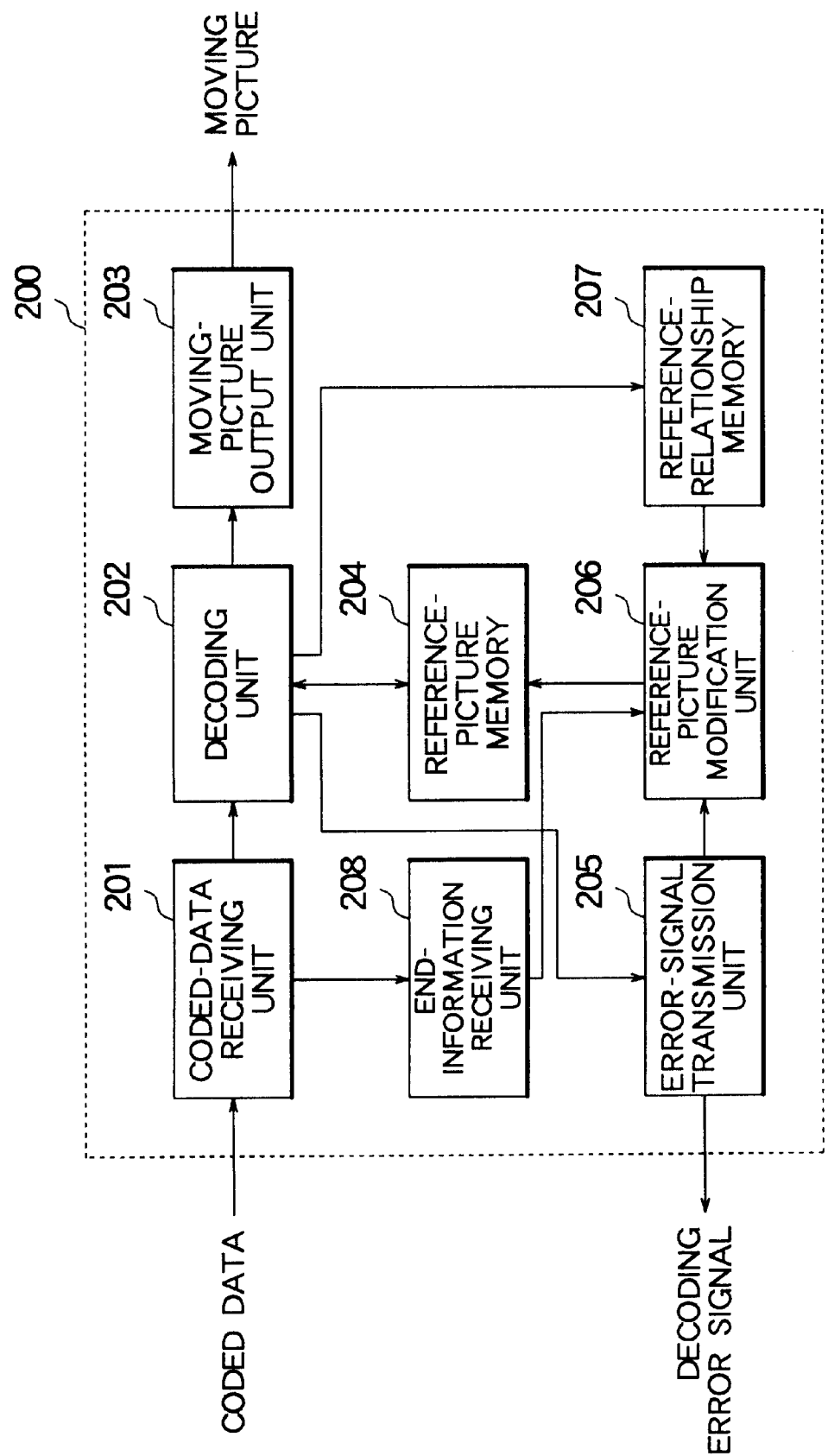
FIG. 5 is a block diagram of the decoding apparatus in the first embodiment.

Referring to FIG. 5, the decoding apparatus 200 in the first embodiment comprises a coded-data receiving unit 201, a decoding unit 202, a moving-picture output unit 203, a reference-picture memory 204, an error-signal transmission unit 205, a reference-picture modification unit 206, a reference-relationship memory 207, and an end-information receiving unit 208.

The coded-data receiving unit 201 receives coded moving-picture data from the coding apparatus 100, multiplexed with frame numbers and block numbers, and supplies all of this information to the decoding unit 202. When end-of-modification information is included with the received data, the coded-data receiving unit 201 supplies this information to the end-information receiving unit 208. If necessary, the coded-data receiving unit 201 also supplies other multiplexed information, such as address information, to the decoding unit 202.

The decoding unit 202 decodes the coded data, and supplies the decoded data to the moving-picture output unit 203 and reference-picture memory 204. Each frame or block may be decoded by either intra-frame or inter-frame decoding, as specified by information in the coded data. In inter-frame decoding, the decoding unit 202 refers to data from the preceding frame, which is stored in the reference-picture memory 204, and supplies the reference-relationship memory 207 with information indicating the blocks in the preceding frame that are used as reference blocks. The decoding unit 202 also decides, from check bits, parity bits, or other redundant bits included in the coded data, or from other criteria, whether each block was decoded correctly. Upon recognizing a decoding error, the decoding unit 202 notifies the error-signal transmission unit 205 of the frame and block number of the block in which the error occurred.

The moving-picture output unit 203 outputs the decoded data received from the decoding unit 202 to, for example, a monitor or other display device.

The reference-picture memory 204 stores the decoded data for two frames: the most recently decoded frame, which is used as a reference frame for inter-frame decoding of the next frame, and the frame immediately preceding the most recently decoded frame.

When notified of a decoding error, the error-signal transmission unit 205 sends a decoding error signal to the coding apparatus 100, giving the frame number and block number of the block in which the error occurred. The error-signal transmission unit 205 also supplies the frame number and block number to the reference-picture modification unit 206. If errors are recognized in multiple blocks in the same frame, the error-signal transmission unit 205 uses a single decoding error signal to report all of the erroneous blocks to the coding apparatus 100.

Upon receiving a frame number (N) and block number from the error-signal transmission unit 205, the reference-picture modification unit 206 modifies the picture data stored in the reference-picture memory 204 by replacing the block in which the error occurred with the corresponding block in the preceding frame (frame N−1). When the next decoded frame (frame N+1) is stored in the reference-picture memory 204, the reference-picture modification unit 206 replaces the error propagation blocks in this frame with picture data from the modified preceding frame (frame N). The reference-picture modification unit 206 continues to modify each new frame stored in the reference-picture memory 204 in this way, until it receives end-of-modification information from the end-information receiving unit 208.

The reference-relationship memory 207 stores the information received from the decoding unit 202 indicating which blocks in the preceding frame were used as reference blocks for inter-frame decoding of each block in the current frame. This information is read by the reference-picture modification unit 206 to determine error propagation.

Upon receiving end-of-modification information from the coded-data receiving unit 201, the end-information receiving unit 208 decides which frame contained the error for which the modification was made, and notifies the reference-picture modification unit 206.

The elements shown in FIGS. 4 and 5 comprise semiconductor memory and logic circuits, detailed descriptions of which will be omitted.

Next, the operation of the first embodiment will be described.

Figure 6:
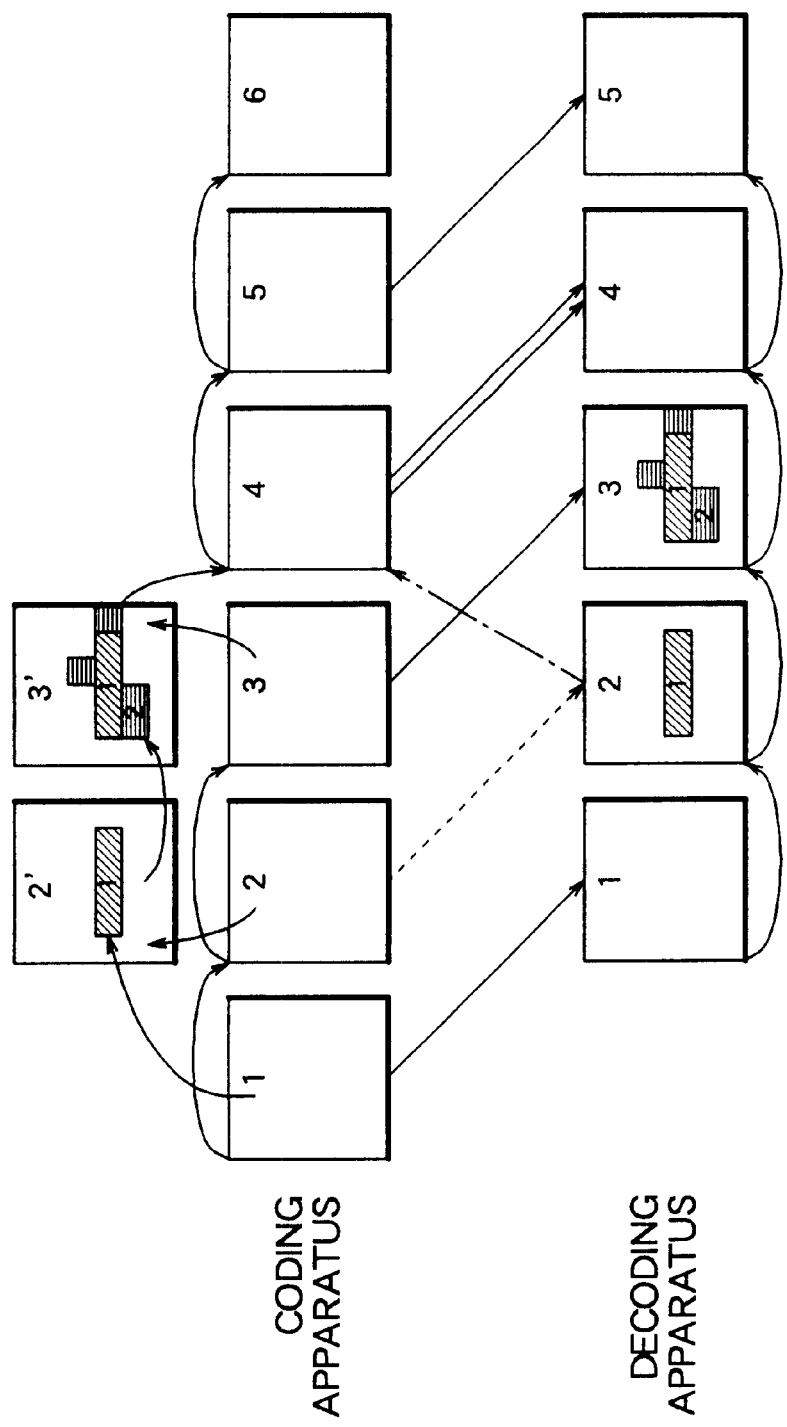
FIGS. 6 and 7 illustrate the operation of the first embodiment.

FIG. 6 shows an exemplary operation in which the coding apparatus 100 codes six frames, numbered 1 to 6, by inter-frame coding. A transmission error occurs in frame 2, as indicated by the dotted arrow, and the decoding apparatus 200 is unable to decode four consecutive blocks in this frame. These four blocks are shaded in frame 2 at the bottom of FIG. 6. Despite having been decoded incorrectly, these four blocks are supplied to the moving-picture output unit 203. The decoded frame 2 may be displayed as is, or standard error-concealment measures may be taken. A simple method of error concealment is to display frame 1 again instead of frame 2. More advanced types of error concealment will be described later. In the reference-picture memory 204, the reference-picture modification unit 206 replaces the four erroneous blocks with the corresponding blocks of data from the preceding frame (frame 1), as indicated by the numeral 1, and the error-signal transmission unit 205 transmits a decoding error signal to the coding apparatus 100, as indicated by the dash-dot arrow. In the meantime, the coding apparatus 100 codes and transmits the next frame (frame 3).

No transmission error occurs in frame 3, but because of error propagation, the decoding apparatus 200 is unable to decode eight blocks correctly, including the four blocks that were erroneous in frame 2 and four neighboring blocks. The incorrectly decoded data are furnished to the moving-picture output unit 203, but the error can be concealed, e.g., by displaying frame 1 again in place of frame 3. In the reference-picture memory 204, the reference-picture modification unit 206 replaces all eight of these blocks by copying the corresponding data from frame 2. The four lightly shaded blocks receive data that originated in frame 2. The four darkly shaded blocks receive data that originated in frame 1. All of the blocks that were decoded incorrectly in frame 2 are thereby replaced with data not affected by the transmission error.

By now, the coding apparatus 100 has received the decoding error signal transmitted from the decoding apparatus 200 for frame 2. Before the next frame (frame 4) is coded, the reference-picture modification unit 107 selects frame 3 as the reference frame to be modified, and makes the same data replacements in the reference-picture memory 105 in the coding apparatus 100 that the reference-picture modification unit 206 made in the reference-picture memory 204 in the decoding apparatus 200. As indicated by the arrows, the reference-picture modification unit 107 replaces four erroneous blocks in frame 2 with data from frame 1, creating a modified frame 2', then replaces eight blocks in frame 3 with data from the modified frame 2', creating a modified reference frame 3' identical to the reference frame 3 stored in the decoding apparatus 200. Frame 4 is coded with reference to the modified reference frame 3'. When the coding apparatus 100 transmits the data for frame 4 to the decoding apparatus 200, the coded-data transmission unit 103 adds end-of-modification information specifying frame 2, indicating that the error in frame 2 has been dealt with by making all necessary modifications of the reference frame used in coding frame 4.

When the decoding apparatus 200 decodes frame 4, the decoded data are stored in the reference-picture memory 204 without further replacements, since frame 4 was accompanied by an end-of-modification signal. Frame 4 is decoded correctly, because both the coding unit 102 and decoding unit 202 refer to identical frame-3 reference data.

No further data replacements are made, and subsequent frames are decoded correctly. A quick and complete recovery has been made from the transmission error in frame 2, without the need for any intra-frame coding. If error concealment is practiced, the viewer sees only a slight impairment of the displayed picture, such as an interruption of motion lasting a fraction of a second.

Figure 7:
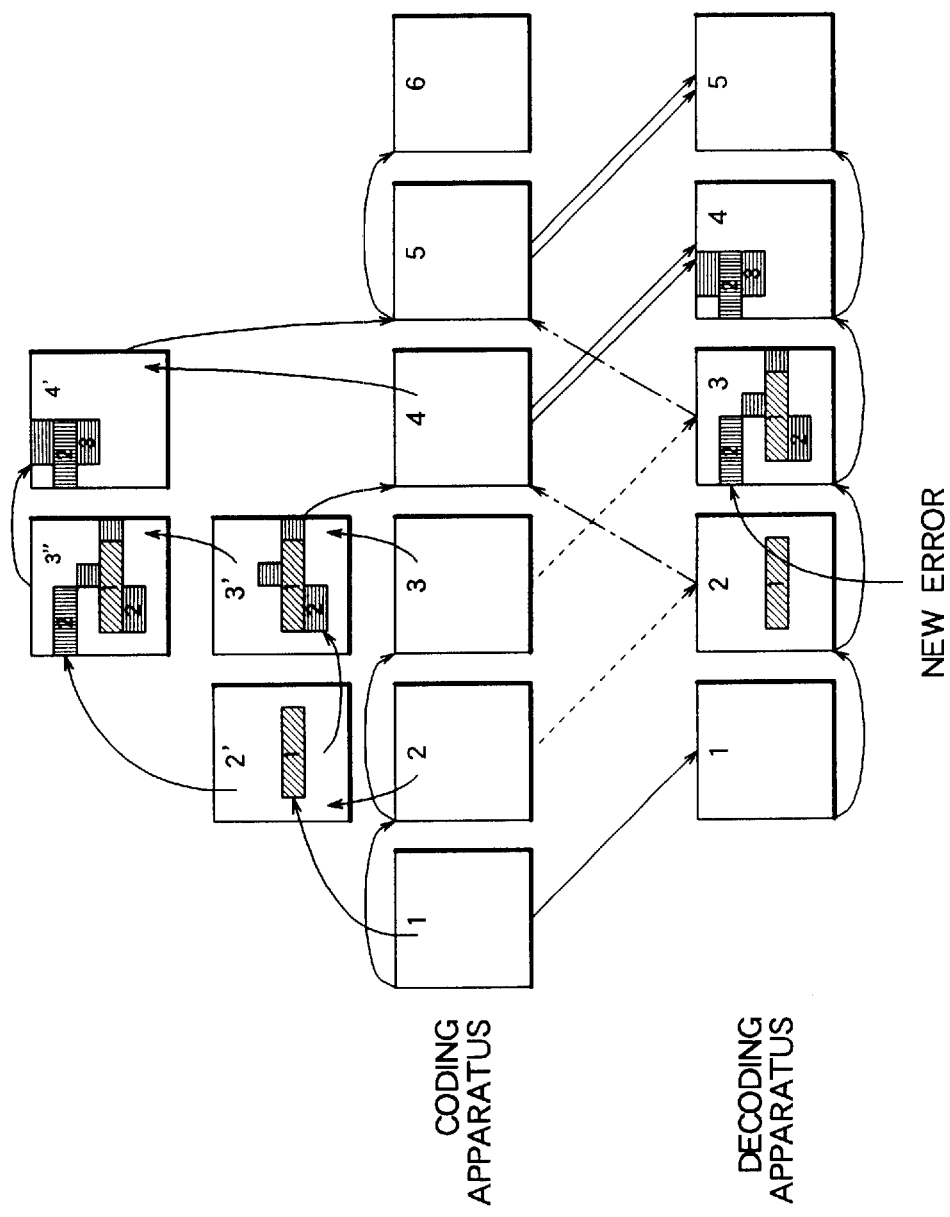

FIG. 7 shows another example of the operation of the first embodiment, in which a second transmission error occurs before recovery from the first transmission error.

The first transmission error occurs in the second frame in FIG. 7 (frame 2), and is dealt with as described above. In the reference-picture memory 204 in the decoding apparatus 200, the erroneous blocks are replaced with data from the preceding frame (frame 1), and a decoding error signal is sent to the coding apparatus 100, reporting the frame number of frame 2 and the block numbers of the erroneous blocks.

The second transmission error occurs in the next frame (frame 3). The blocks that cannot be decoded correctly by the decoding unit 202 include the four blocks that were erroneous in frame 2, four more error propagation blocks, and three newly erroneous blocks. In the reference-picture memory 204, all of these blocks are replaced with data from the preceding frame (frame 2), four of the replacement blocks having originated in frame 1. The error-signal transmission unit 205 sends the coding apparatus 100 another decoding error signal, reporting the block numbers of the three new error blocks.

Before coding the next frame (frame 4), the coding apparatus 100 receives the first decoding error signal, reporting the error in frame 2, and modifies the contents of reference frames 2 and 3 in the reference-picture memory 105,. as described above. Frame 4 is coded with reference to the modified reference frame 3', and transmitted to the decoding apparatus 200 together with an end-of-modification signal indicating that the necessary modifications have been made for the error that occurred in frame 2.

Frame 4 is received without further transmission errors. Although no decoding error is detected, the decoded picture is not entirely correct, because the reference data used for decoding are not identical to the reference data used for coding. Specifically, three reference blocks are not identical. In the reference-picture memory 204, the reference-picture modification unit 206 replaces the data for these three blocks and four more error propagation blocks with corresponding data from modified reference frame 3. The reference-picture modification unit 206 thus replaces the blocks affected by the transmission error in frame 3, for which no end-of-modification signal has been received, but does not replace the blocks that were affected by the error in frame 2, for which an end-of-modification signal has been received.

In the meantime, the coding apparatus 100 receives the decoding error signal reporting the error in frame 3 and identifying the three erroneous blocks. The reference-picture modification unit 107 now makes a further modification of the data for frame 3' stored in the reference-picture memory 105, replacing these three blocks with data from frame 2'. These further modifications create a frame 3" that matches the frame-3 data stored in the decoding apparatus 200. In addition, the reference-picture modification unit 107 modifies frame 4, replacing the seven error propagation blocks with data from modified frame 3", making the same replacements as were made by the reference-picture modification unit 206 in the decoding apparatus 200. Thus modified, the reference frame 4' stored in the reference-picture memory 105 in the coding apparatus 100 matches the reference frame 4 stored in the reference-picture memory 204 in the decoding apparatus 200. The decoding unit 202 now codes frame 5 with reference to the modified reference frame 4', and the coded-data transmission unit 103 transmits the coded data to the decoding apparatus 200, together with end-of-modification information specifying frame 3.

The decoding apparatus 200 decodes frame 5 with reference to the modified reference frame 4 stored in the reference-picture memory 204, obtaining a correctly decoded picture, because frame 5 has been coded and decoded with reference to identical data. Since end-of-modification information has now been received for the errors in both frames 2 and 3, no further replacements of reference data are made. Subsequent frames are decoded correctly.

Although the decoding apparatus 200 outputs erroneous picture data for frames 2, 3, and 4, the errors can be concealed by standard methods, as noted above.

In the example in FIG. 7, the effect of the transmission error in frame 2 does not overlap the effect of the transmission error in frame 3, but even if such overlap were to occur, a correct recovery would still be made from both errors, because all erroneous blocks and error propagation blocks are ultimately replaced with correct blocks, unaffected by any-errors, from a previous frame. For the same reason, a correct recovery would also be made if, due to the vagaries of network transmission, the decoding error signals for the errors in frames 2 and 3 were to arrive simultaneously at the coding apparatus 100, or even if the decoding error signal for frame 3 were to arrive before the decoding error signal for frame 2. The necessary replacements for the two errors can be made in either order, with the same end effect. The two sets of replacements can also be combined into a single replacement operation, in which case frame 3 only has to be modified once in the coding apparatus 100, and the end-information generator 109 only has to generate end-of-modification information once. In this case, if the decoding apparatus 200 receives end-of-modification information specifying frame 3, it can assume that replacements have also been completed for the error in frame 2.

As described above, the first embodiment recovers from transmission errors quickly, without the need for inefficient types of coding that would force a reduction in picture quality. Specifically, the first embodiment requires neither the frequent use of intra-frame coding, nor the use of a strong error-correcting code with many redundant bits. Moreover, the first embodiment confines the modification of reference-frame data to blocks actually affected by the error. This further helps to maintain high picture quality, because fewer modifications to the reference frame generally mean less loss of coding efficiency in the frame being coded.

The first embodiment also halts error propagation quickly, limiting picture degradation to an extent that can be effectively concealed, without waiting for a cyclic refresh or refresh-on-demand. By storing information identifying the reference data used in coding each block, the first embodiment is able to limit both spatial and temporal error propagation.

In the first embodiment, it is not necessary for every frame to be divided into blocks in the same way. The size and shape of the blocks can be varied from frame to frame, depending on the reported occurrence of transmission errors, and on picture characteristics such as the occurrence or nonoccurrence of motion. Robust and highly efficient picture coding can be achieved in this way.

The first embodiment is not limited to the block replacement scheme described above. The reference frames stored in the coding apparatus 100 and decoding apparatus 200 can be modified in any way that makes them mutually identical. For example, erroneous blocks can be replaced with data taken from neighboring blocks in the same frame, or with a combination of data taken from the preceding frame and from neighboring blocks in the same frame. The decoding apparatus 200 can select the most efficient modification procedure, and can include information describing the modification procedure in the decoding error signal, so that the coding apparatus 100 can follow the same modification procedure. This enables the decoding apparatus 200 to minimize the degradation of the modified reference frame, leading to higher coding efficiency and reducing the effect of transmission errors on picture quality.

In another variation of the first embodiment, instead of sending decoding error signals, the decoding apparatus 200 sends the coding apparatus 100 a positive acknowledgment signal for each successfully decoded block. The coding apparatus 100 recognizes a decoding error when a positive acknowledgment signal fails to arrive. In a further variation, the decoding apparatus 200 sends both positive acknowledgment signals and decoding error signals.

If the round-trip propagation delay on the link between the coding apparatus 100 and decoding apparatus 200 is short enough that the coding apparatus 100 receives the acknowledgment signals or decoding error signal for one frame before it begins coding the next frame, then when a transmission error occurs, it is only necessary to modify the error blocks. Error propagation blocks do not have to be modified, because the modification is completed before the error propagates into the next frame. The transmission of end-of-modification information from the coding apparatus 100 to the decoding apparatus 200 also becomes unnecessary. In this case, the reference-relationship memory 108 and end-information generator 109 can be omitted from the coding apparatus shown in FIG. 4, and the reference-relationship memory 207 can be omitted from the decoding apparatus shown in FIG. 5.

2nd Embodiment

The second embodiment is generally similar to the first, but determines error propagation blocks on the basis of the severity of the propagation. Blocks that are only slightly affected by error propagation are left unmodified, to avoid further impairment of their quality and attendant loss of coding efficiency. The second embodiment considers error propagation within the same frame, as well as error propagation from one frame to the next.

Figure 8:
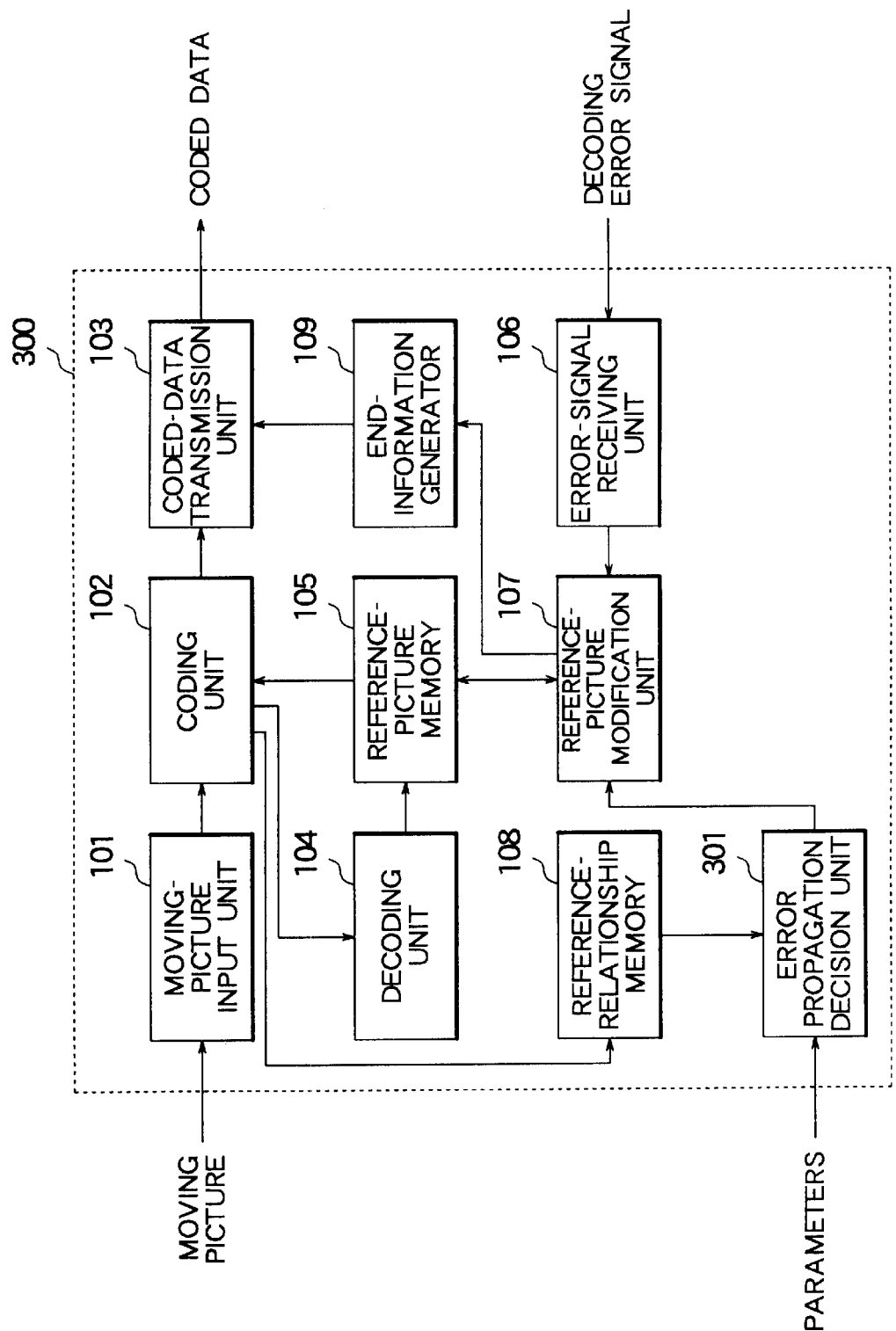
FIG. 8 is a block diagram of the coding apparatus in a second embodiment of the invention.

Referring to FIG. 8, the coding apparatus 300 in the second embodiment has the same elements as in the first embodiment, and an additional error propagation decision unit 301. The error propagation decision unit 301 receives the block numbers output by the reference-relationship memory 108, uses externally supplied decision parameters to decide which blocks shall be treated as error propagation blocks, and sends the block numbers of these blocks to the reference-picture modification unit 107. The supplied parameters indicate, for example, parameters specifying the decision criteria and method.

Referring to FIG. 9, the decoding apparatus 400 in the second embodiment has the same elements as in the first embodiment, and an additional error propagation decision unit 401. The error propagation decision unit 401 receives the block numbers output by the reference-relationship memory 207, uses externally supplied decision parameters to decide which blocks shall be treated as error propagation blocks, and sends the block numbers of these blocks to the reference-picture modification unit 206. The error propagation decision unit 401 is supplied with the same parameters as the error propagation decision unit 301 in the coding apparatus 100.

Before the operation of the second embodiment is explained, the two types of error propagation, one arising from an error that occurred in a previous frame and the, other arising from an error in the same frame, will be described in more detail.

Figure 10A:
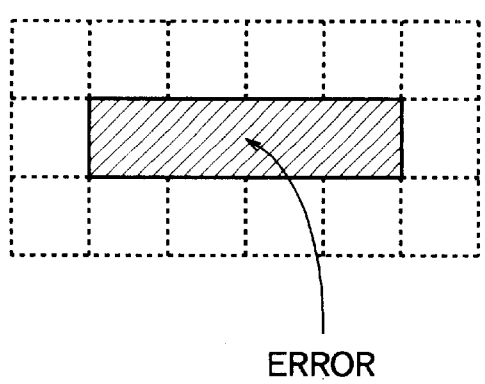
FIGS. 10A and 10B illustrate error propagation from one frame to another.
Figure 10B:
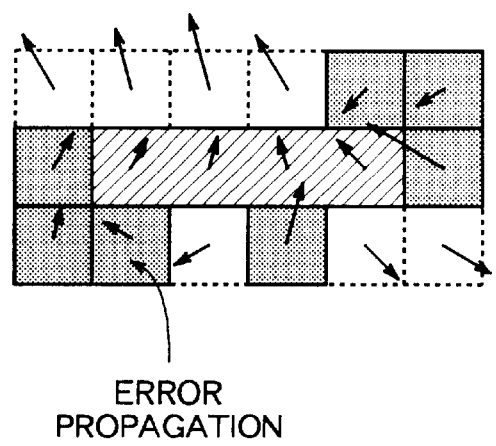

FIGS. 10A and 10B show an example of the propagation of an error from one frame (FIG. 10A) to the next frame (FIG. 10B). Each pixel in FIG. 10B is related to a pixel in FIG. 10A by a motion vector. The coding unit 102 codes the difference between the two related pixels. All pixels in the same block in FIG. 10B have the same motion vector. Depending on the length and direction of the motion vector, a block in FIG. 10B may be coded with reference to pixels in several blocks in FIG. 10A. If any one of these reference blocks in FIG. 10A is erroneous, the coded block in FIG. 10B becomes a potential error propagation block. The shaded blocks in FIG. 10A are error blocks, the arrows in FIG. 10B are motion vectors, and the shaded blocks in FIG. 10B are potential error propagation blocks.

Figure 11:
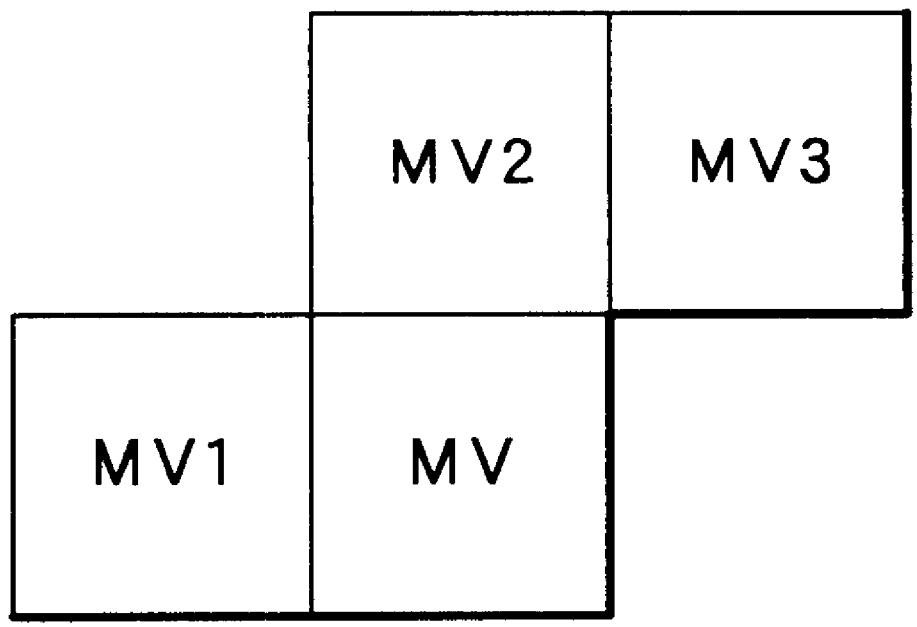
FIG. 11 illustrates the coding of motion vectors.

FIG. 11 explains the principle of error propagation due to an error in the same frame. MV, MV1, MV2, and MV3 represent the motion vectors of the indicated blocks. In the H.263 and MPEG-2 coding systems, motion vectors are predicted from the motion vectors of neighboring blocks, and the difference from the prediction is coded. In FIG. 11, MV is predicted from MV1, MV2, and MV3. If any one of these three motion vectors MV1, MV2, and MV3 is decoded incorrectly, motion vector MV will be decoded incorrectly, and depending on the contents of the neighboring blocks, all of the pixels in the MV block may be decoded incorrectly.

Since this type of error propagation could permit a single erroneous motion vector to corrupt an entire frame, in the H.263 and MPEG-2 systems, the blocks are divided into groups, sometimes referred to as slices, and motion vectors are predicted only from other motion vectors in the same slice, to prevent motion-vector errors from propagating across slice boundaries.

Errors can also propagate within the same frame because of overlapping motion estimation, the use of a block-boundary smoothing filter, advanced intra-frame ACDC coding, and any other coding techniques that code a block with reference to its neighboring blocks.

The error propagation decision units 301 and 401 in the second embodiment identify error propagation blocks by distinguishing between major and minor error-propagation effects. For example, the decoding of a block with reference to only a small part of an erroneous block can be considered a minor effect, while an error in the first motion vector in a slice is considered a major effect. Depending on the details of the coding method, error propagation within the same frame may be considered a major effect and error propagation from the preceding frame a minor effect, or vice versa. The different forms of error propagation can also be weighted, and error propagation effects can be judged on the basis of a weighted sum of propagated errors. In the second embodiment, only blocks with major error-propagation effects are considered to be error-propagation blocks. Minor error-propagation effects are ignored.

In distinguishing between major and minor error-propagation effects, the error propagation decision unit 301 and error propagation decision unit 401 both use the same parameters, so they identify the same error propagation blocks. The reference-picture modification units 107 and 206 accordingly make the same modifications to the same reference-frame blocks.

The second embodiment operates in substantially the same way as the first embodiment, but by providing a degree of freedom in the identification of error propagation blocks, the second embodiment can reduce the extent of the modifications made to deal with error propagation. Compared with the first embodiment, this can lead to more efficient coding and higher picture quality. The reason is that it can be advantageous to ignore minor errors in order to use the most recent reference data, rather than use older reference data which, although error-free, differ considerably from the picture data about to be coded.

3rd Embodiment

In the third embodiment, the decoding apparatus transmits decoding error signals repeatedly until it receives end-of-modification information from the coding apparatus. The coding apparatus disregards decoding error signals received after the modification has been completed.

Figure 12:
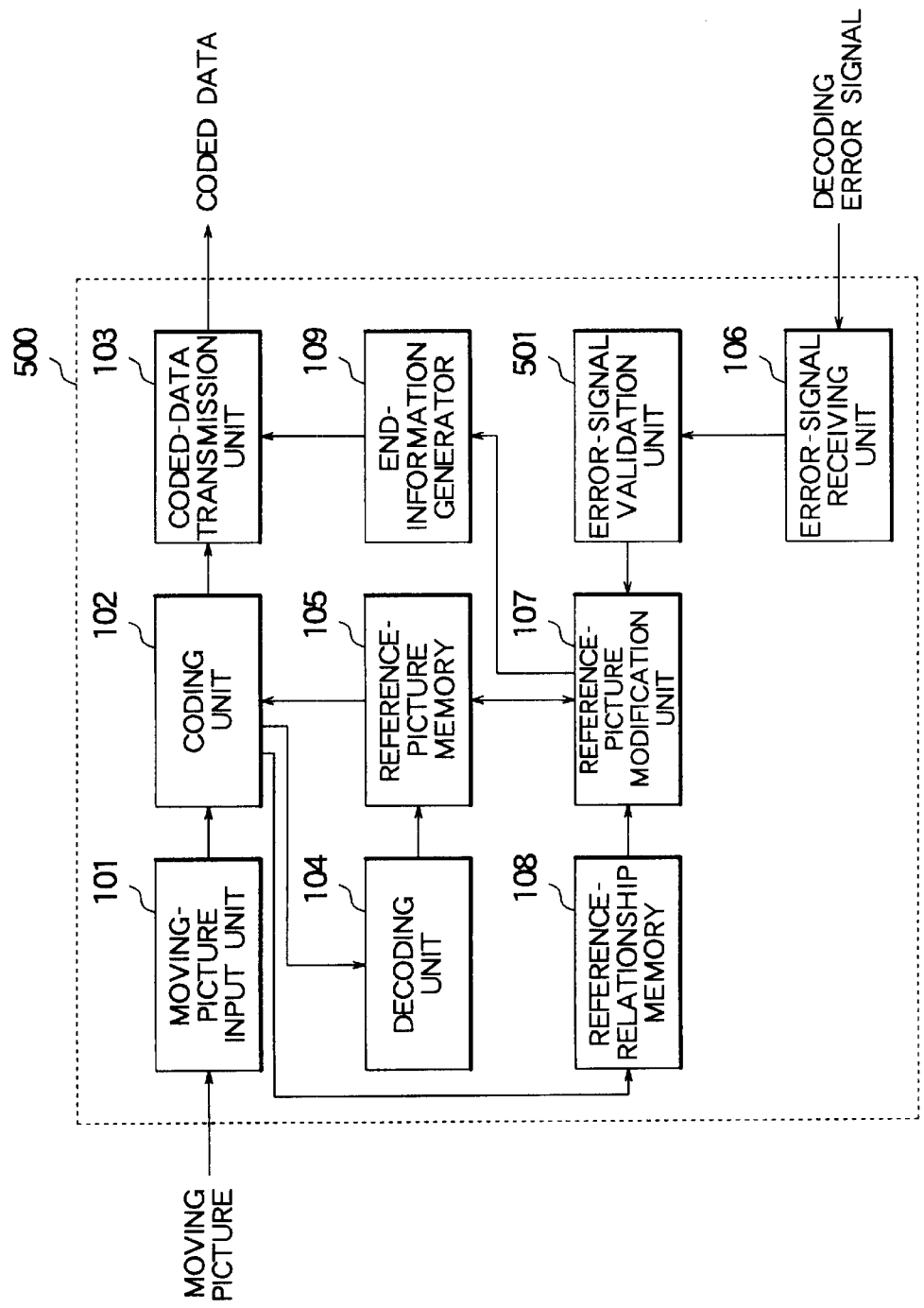
FIG. 12 is a block diagram of the coding apparatus in a third embodiment of the invention.

Referring to FIG. 12, the coding apparatus 500 in the third embodiment has the elements shown in the first embodiment, and an additional error-signal validation unit 501 inserted between the error-signal receiving unit 106 and reference-picture modification unit 107. The error-signal validation unit 501 decides whether each decoding error signal received by the error-signal receiving unit 106 is valid or invalid, and passes only the valid decoding error signals to the reference-picture modification unit 107. A decoding error signal is invalid if it designates a frame number and block number matching a frame number and block number that were specified in a decoding error signal received previously. Decoding error signals not meeting this condition are valid.

Figure 13:
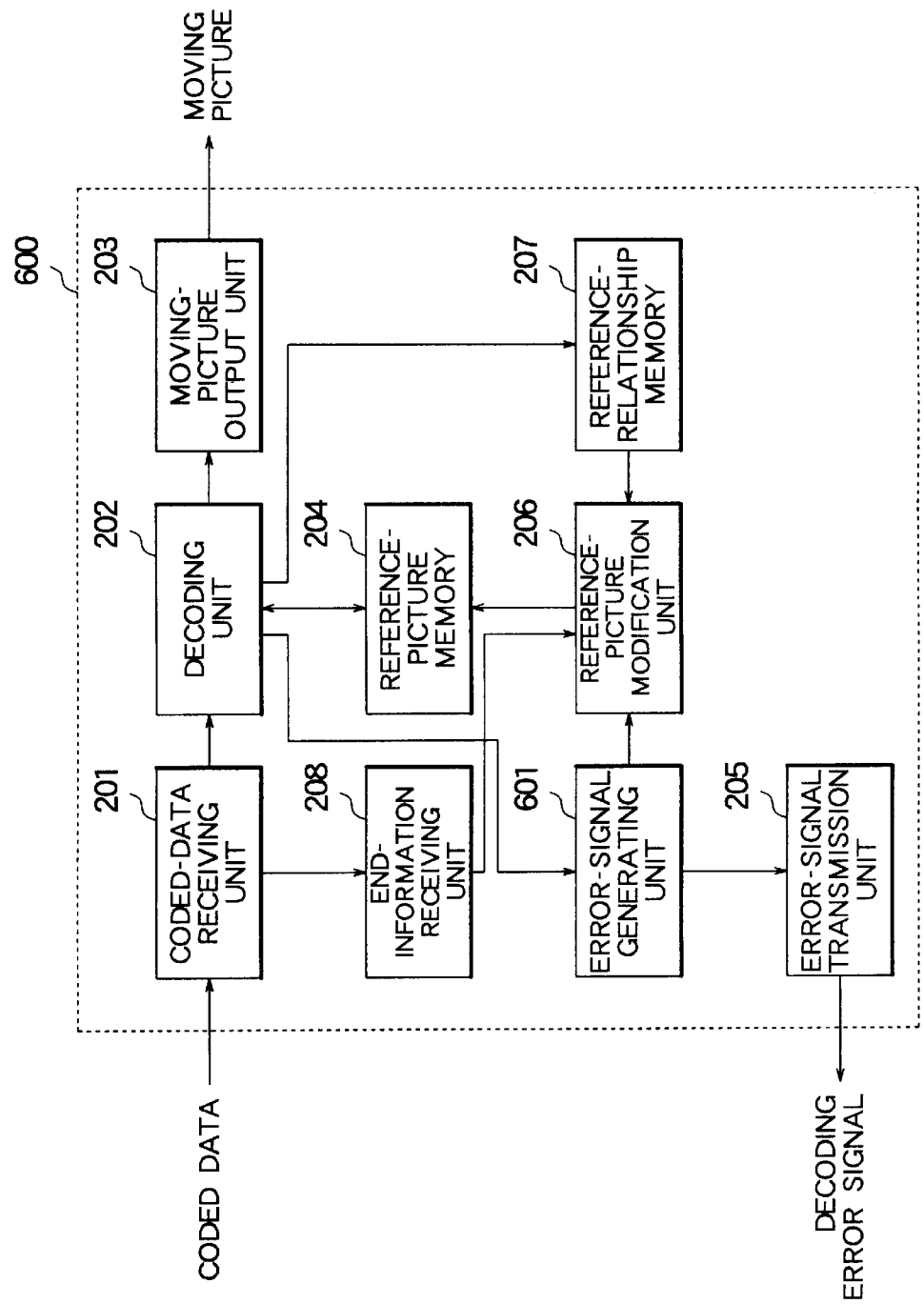
FIG. 13 is a block diagram of the decoding apparatus in the third embodiment.

Referring to FIG. 13, the decoding apparatus 600 in the third embodiment has the elements shown in the first embodiment, and an additional error-signal generating unit 601 inserted between the decoding unit 202 and error-signal transmission unit 205. When notified by the decoding unit 202 of a decoding error, the error-signal generating unit 601 generates a decoding error signal, and supplies the generated decoding error signal to the error-signal transmission unit 205 once per frame, specifying the same frame and block numbers, until corresponding end-of-modification information is received by the end-information receiving unit 208.

When no transmission error occurs, the third embodiment operates in exactly the same way as the first embodiment.

Figure 14:
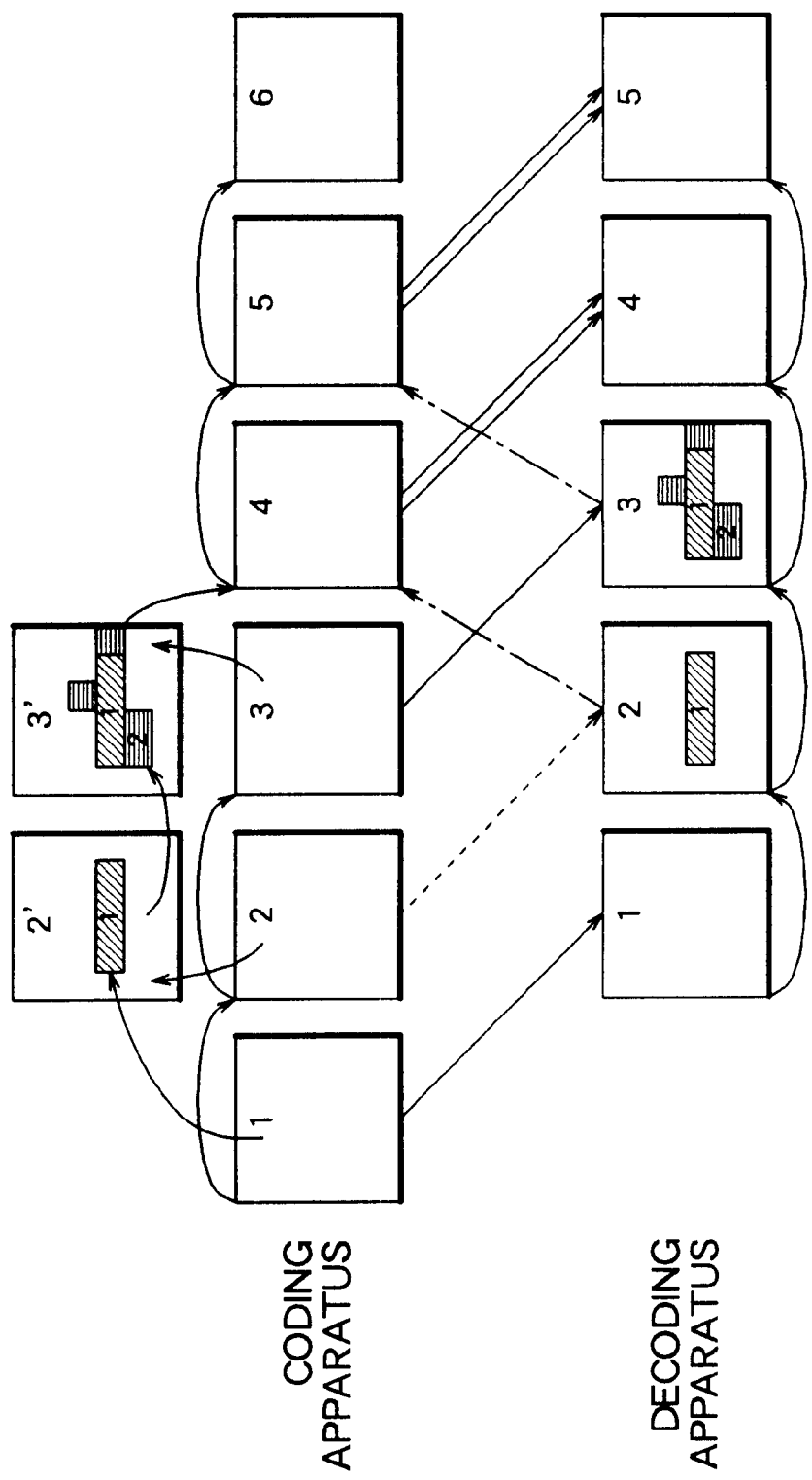
FIGS. 14 and 15 illustrate the operation of the third embodiment.

FIG. 14 illustrates the operation of the third embodiment for the case illustrated in FIG. 6, in which a transmission error occurs in frame 2. In the decoding apparatus 600, the error-signal generating unit 601 generates a decoding error signal, specifying the four indicated blocks in frame 2. The error-signal transmission unit 205 transmits this decoding error signal to the coding apparatus 500 both upon completion of the decoding of frame 2 and upon completion of the decoding of frame 3, as indicated by the dash-dot arrows. The reference-picture modification unit 206 modifies the data in the reference-picture memory 204 in the same way as in the first embodiment.

When the coding apparatus 500 receives the first decoding error signal, before coding frame 4, the error-signal validation unit 501 determines that the decoding error signal is valid, and the reference-picture modification unit 107 makes the same modifications in the reference-picture memory 105 as the reference-picture modification unit 206 made in the reference-picture memory 204. Frame 4 is coded with reference to the modified reference frame 3', and sent to the decoding apparatus 600 together with end-of-modification information. The error-signal generating unit 601 now stops supplying decoding error signals to the error-signal transmission unit 205; no decoding error signal is returned to the coding apparatus 500 for frame 4.

When the coding apparatus 500 receives the second decoding error signal, before coding frame 5, the error-signal validation unit 501 recognizes the same frame number and block numbers as before, and determines that the decoding error signal is invalid. The decoding error signal is not passed to the reference-picture modification unit 107, and no further modifications are made.

Aside from the sending of the same decoding error signal twice, the operations depicted in FIG. 14 are identical to the operations depicted in FIG. 6. The same modifications are made to the reference frame data.

Figure 15:
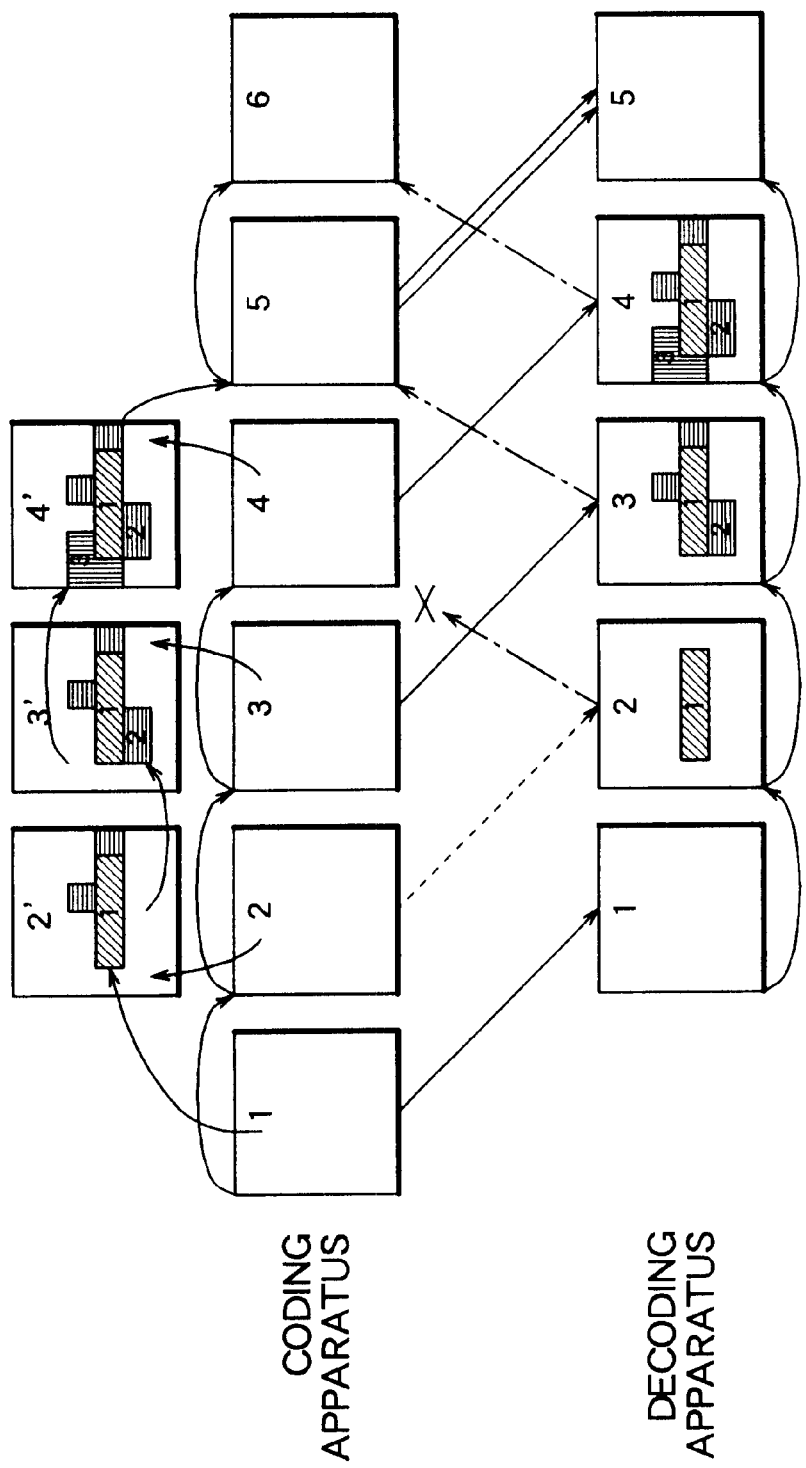

FIG. 15 illustrates the operation of the third embodiment when a transmission error occurs in the transmission of a decoding error signal from the decoding apparatus 600 back to the coding apparatus 500. The coding apparatus 500 fails to receive the first decoding error signal, transmitted after the decoding of frame 2. As a result, the coding apparatus 500 codes frame 4 with reference to the unmodified reference frame 3, and transmits frame 4 without end-of-modification information. The decoding apparatus 600 accordingly transmits the same decoding error signal again after decoding frame 4, as well as after decoding frames 2 and 3, and modifies the frame-4 data stored in the reference-picture memory 204.

The decoding error signal transmitted after the decoding of frame 3 is received by the coding apparatus 500 and found valid. The reference-picture modification unit 107 modifies frames 2, 3, and 4 in the reference-picture memory 105, and the decoding unit 202 uses the modified reference frame 4' to code frame 5. Frame 5 is transmitted together with end-of-modification information, causing the decoding apparatus 600 to stop sending decoding error signals. The decoding apparatus 600 decodes frame 5 correctly, with reference to the modified version of frame 4.

The third embodiment recovers from a transmission error even if there is an error in the transmission of the decoding error signal back to the coding apparatus 500. As FIG. 15 shows, the loss of a decoding error signal may delay recovery by one frame, but further impairment is avoided. The third embodiment thus operates with a high degree of reliability.

In the third embodiment, since decoding error signals are sent repeatedly until end-of-modification information is received, the decoding error signal itself does not need to be protected by a strong error-correcting-code, or by other measures, such as re-transmission, that would require extra bandwidth on the return channel from the decoding apparatus 600 to the coding apparatus 500. The return channel quality need be no higher than the quality of the forward channel from the coding apparatus 500 to the decoding apparatus 600, and the error-signal transmission unit 205 and error-signal receiving unit 106 can be simplified.

4th Embodiment

The fourth embodiment further reduces picture degradation when transmission errors occur, by explicitly incorporating error concealment.

Figure 16:
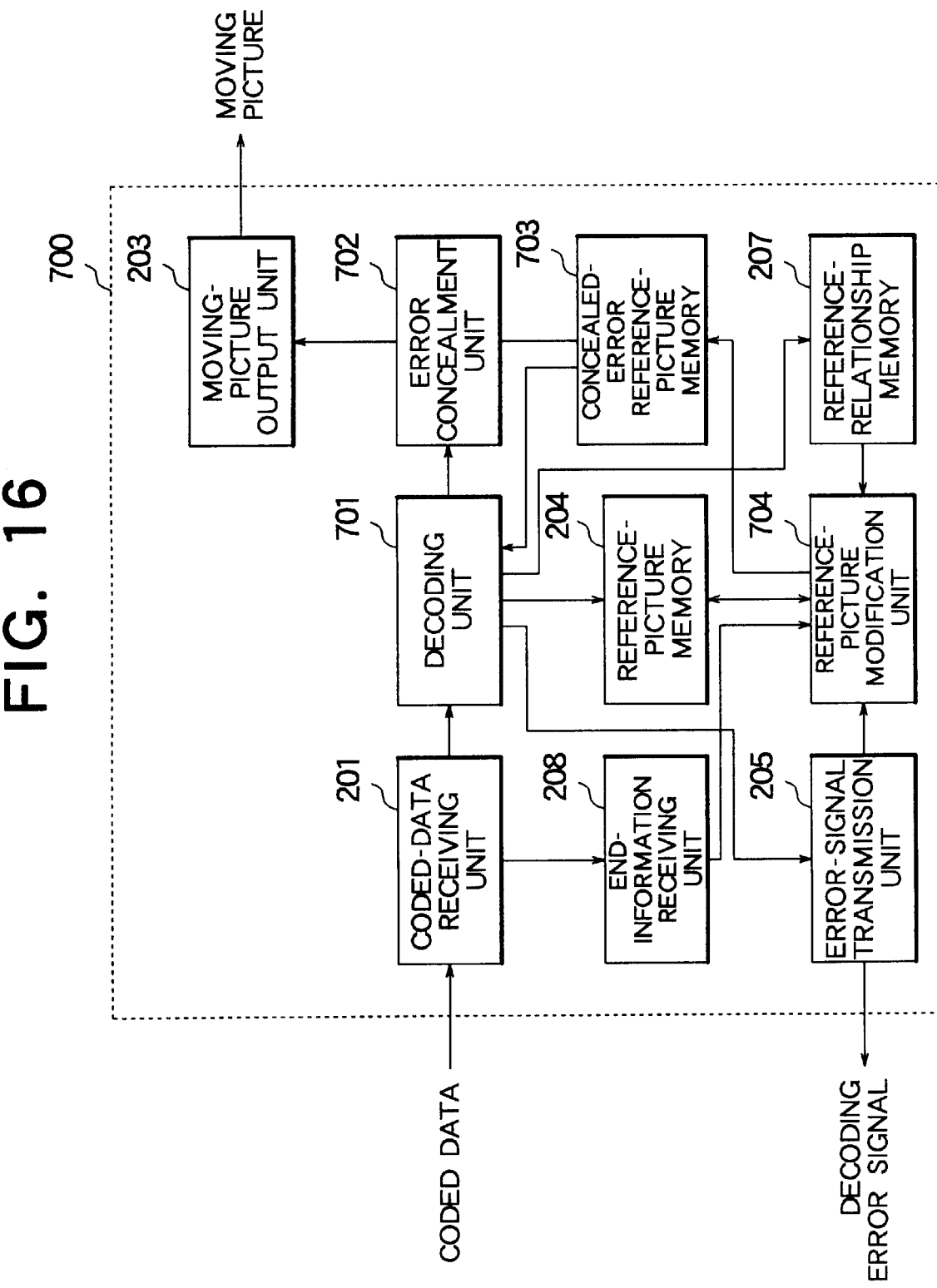
FIG. 16 is a block diagram of the decoding apparatus in the fourth embodiment.

Referring to FIG. 16, in comparison with the first embodiment, the decoding apparatus 700 in the fourth embodiment has an altered decoding unit 701, an additional error concealment unit 702 and concealed-error reference-picture memory 703, and an altered reference-picture modification unit 704.

The decoding unit 701 performs the same decoding operations as in the first embodiment, but uses data stored in the concealed-error reference-picture memory 703 for reference during inter-frame decoding, and sends the coded data to the error concealment unit 702 instead of the moving-picture output unit 203. The decoding unit 701 also supplies the error concealment unit 702 with information for use in error concealment, including the block numbers of any detected erroneous blocks, and writes each decoded frame in the reference-picture memory 204, but does not read the data stored in the reference-picture memory 204.

When the error concealment unit 702 receives a decoded frame with no errors, it simply passes the frame to the moving-picture output unit 203, and stores the frame in the concealed-error reference-picture memory 703. In this case, the concealed-error reference-picture memory 703 and the reference-picture memory 204 store the same data, so it makes no difference whether the decoding unit 701 refers to the data stored in the reference-picture memory 204, as in the first embodiment, or the data stored in the concealed-error reference-picture memory 703.

When the error concealment unit 702 receives a decoded frame with an error, it uses the supplied error concealment information to repair all erroneous blocks, including error propagation blocks, without altering other blocks. Various known methods of error concealment can be employed. For example, an erroneous block can be regenerated on the basis of the motion vectors and difference data of neighboring blocks. When a block is coded by means of different types of information, such as difference information and motion vectors, if only one type of information is corrupted, the uncorrupted information can also be used in repairing the block. Compared with simple replacement of erroneous blocks with data from a preceding frame, this type of error concealment can significantly reduce picture degradation. Following the error-concealment process, the frame is supplied to the moving-picture output unit 203 and stored in the concealed-error reference-picture memory 703.

The concealed-error reference-picture memory 703 stores at least the most recent frame supplied by the error concealment unit 702.

The reference-picture modification unit 704 performs the same operations as in the first embodiment, replacing error blocks and error propagation blocks in the reference-picture memory 204 with data from the preceding frame. In addition, when the end-information receiving unit 208 receives end-of-modification information, the reference-picture modification unit 704 copies the relevant blocks of the most recent modified frame from the reference-picture memory 204 to the concealed-error reference-picture memory 703, replacing the corresponding blocks of the most recent frame stored in the concealed-error reference-picture memory 703.

The fourth embodiment uses the same coding apparatus 100 as in the first embodiment.

Figure 17:
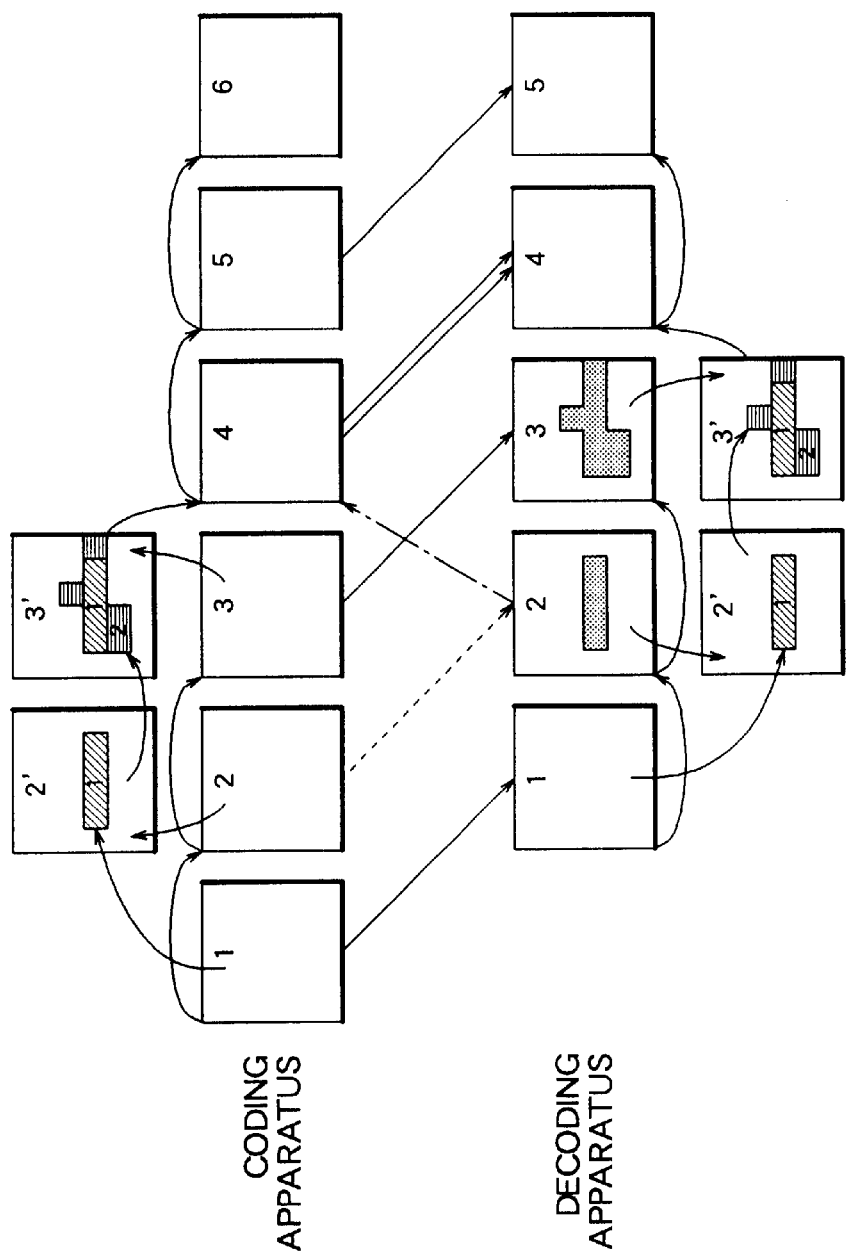
FIGS. 17 and 18 illustrate the operation of the fourth embodiment.

FIG. 17 illustrates the operation of the fourth embodiment for the case illustrated in FIG. 6, when a transmission error occurs in frame 2. The operations performed by the coding apparatus 100 are the same as in the first embodiment.

When frame 2 is decoded in the decoding apparatus 700, the decoded picture data are stored in the reference-picture memory 204 and the error blocks are replaced with data from the preceding frame (frame 1), as in the first embodiment, to produce a modified frame (frame 2'). In addition, the. error concealment unit 702 performs error concealment, modifying the same error blocks in a different way, to produce an error-concealed frame (frame 2).

In decoding frame 3, the decoding unit 701 refers to frame 2 in the concealed-error reference-picture memory 703, instead of frame 2' in the reference-picture memory 204. The decoded result may therefore differ from the first embodiment, but all differing blocks are error propagation blocks, which are replaced by the reference-picture modification unit 704 with data from the preceding frame (frame 2') stored in the reference-picture memory 204. After this modification, the frame 3' stored in the reference-picture memory 204 and the frame 3',referred to in the coding of frame 4 in the coding apparatus 100 are identical, as in the first embodiment.

The data output by the decoding unit 701 for frame 3 are less erroneous than in the first embodiment, because they have been decoded with reference to frame-2 data in which the original transmission errors have been concealed to some extent. The error concealment unit 702 is thus able to conceal errors in frame 3 more effectively than they could be concealed in the first embodiment.

When frame 4 is decoded, since it is accompanied by end-of-modification information, the reference-picture modification unit 704 copies the modified blocks of frame 3' from the reference-picture memory 204 to the concealed-error reference-picture memory 703, and the decoding unit 701 refers to these modified data (frame 3') instead of the data produced by the error concealment unit 702. Accordingly, the decoding unit 701 refers to the same data as used by the coding apparatus 100 in coding frame 4, and frame 4 is decoded correctly.

For simplicity, FIG. 17 shows frame 4 being decoded with reference to frame 3' in the reference-picture memory 204, instead of showing the copying of blocks from the reference-picture memory 204 to the concealed-error reference-picture memory 703, but since all differing blocks are copied, the result is the same.

Figure 18:
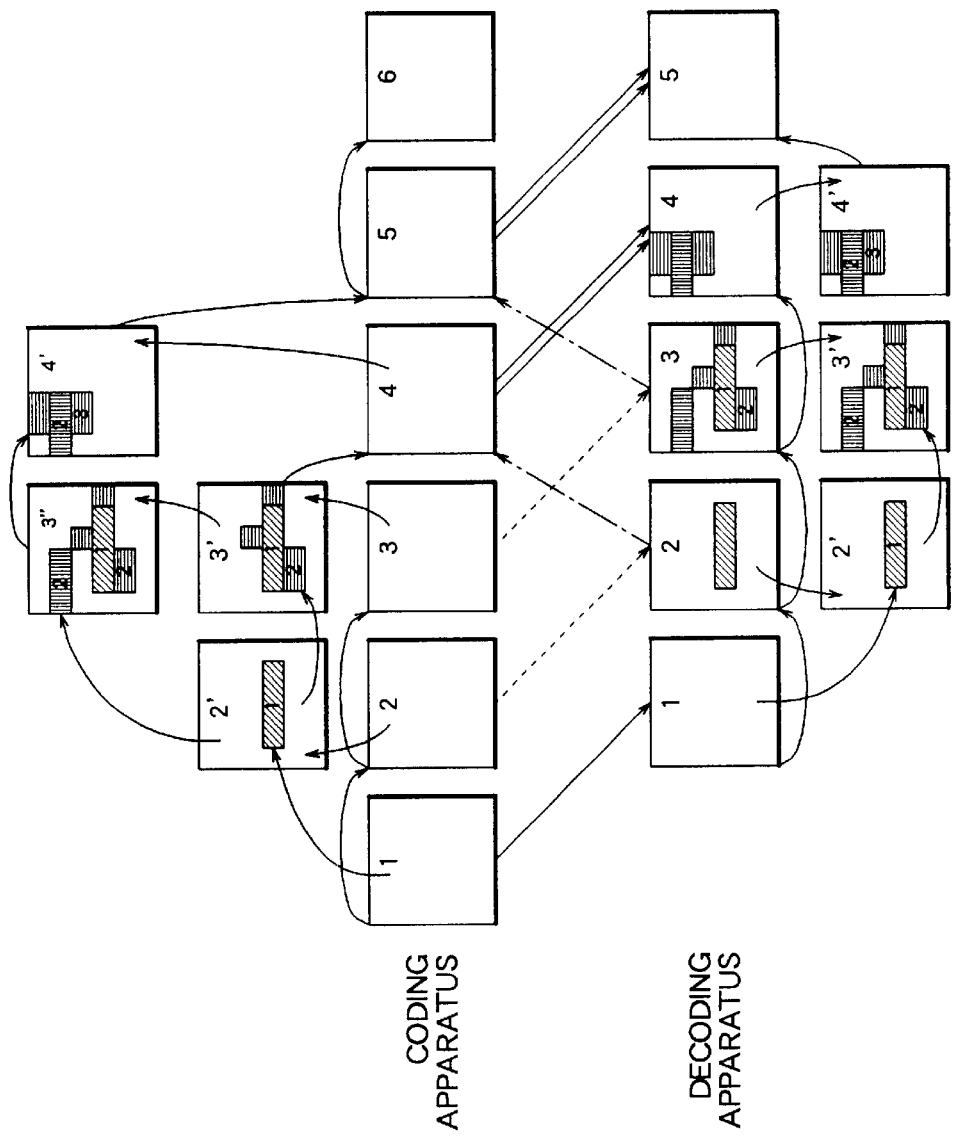

FIG. 18 illustrates the operation of the fourth embodiment when transmission errors occur in both frames 2 and 3. The coding apparatus 100 operates in the same way as in the first embodiment, as can be seen by comparing FIG. 18 with FIG. 7.

In the decoding apparatus 700, modified frames 2 and 3 (frames 2' and 3') are stored in the reference-picture memory 204, while the error concealment unit 702-performs error concealment as described above. In frame 3, the error concealment unit 702 conceals both the errors-that occurred in frame 3, and the errors that propagated from frame 2.

Frame 4 arrives with end-of-modification information for the error that occurred in frame 2. The reference-picture modification unit 704 copies the error propagation blocks that were modified in frame 3' because of the transmission error in frame 2 from the reference-picture memory 204 to the concealed-error reference-picture memory 703. The reference-picture modification unit 704 does not copy the blocks in frame 3' that were modified solely because of the transmission error in frame 3. In decoding frame 4, the decoding unit 701 refers to a composite frame that differs from the frame-three data referred to by the coding unit 102 in the coding apparatus 100 only in regard to the three new error blocks, and generates a decoded frame that differs from the frame stored in the coding apparatus 100 only in regard to the error propagation blocks resulting from the three new error blocks.

Frame 5 arrives with end-of-modification for the error that occurred in frame 3. The reference-picture modification unit 704 now copies the modified error propagation blocks in frame 4', resulting from the transmission error in frame 3, from the reference-picture memory 204 to the concealed-error reference-picture memory 703, thereby replacing all blocks that differ from the data stored in the reference-picture memory 105 in the coding apparatus 100. The decoding unit 701 accordingly decodes frame 5 with reference to the same data (frame 4') as used by the coding unit 102 in coding frame 5. Consequently, frame 5 is decoded correctly. For simplicity, FIG. 18 shows frame 5 being decoded with reference to frame 4' in the reference-picture memory 204 instead showing the copying of the modified blocks from frame 4' to the concealed-error reference-picture memory 703, but since all differing blocks are copied, the result is the same.

In this example, there is no overlap between the blocks affected by the transmission errors in frames 2 and 3, but even if such overlap were present, frame 5 would still be decoded correctly. The reason is that the same modifications are made in the reference-picture memory 204 as in the reference-picture memory 105, as explained in the first embodiment, and when all modifications have been completed in the coding apparatus 100, all blocks in the concealed-error reference-picture memory 703 that were modified by error concealment are replaced by the corresponding modified blocks from the reference-picture memory 204.

The fourth embodiment recovers from transmission errors with the same speed and effectiveness as the first embodiment. In addition, during the period from the occurrence of a transmission error to the completion of the recovery process, the decoding unit in the fourth embodiment uses reference data in which error concealment has been carried out, enabling the picture to be decoded and reproduced with less degradation.

5th Embodiment

The fifth embodiment reduces the amount of modification performed in the first embodiment by making replacements in only one frame per transmission error.

Figure 19:
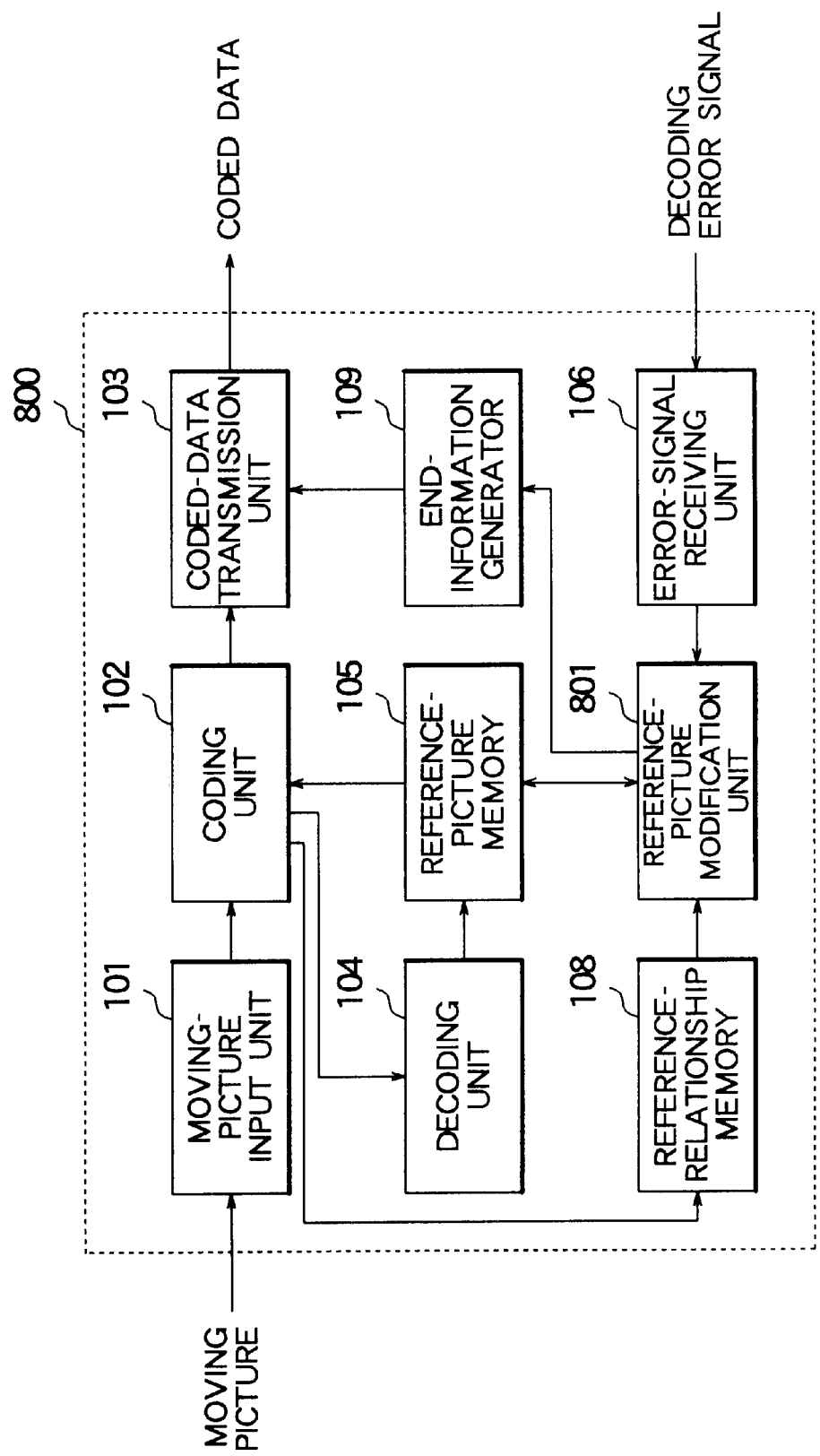
FIG. 19 is a block diagram of the coding apparatus in a fifth embodiment of the invention.

Referring to FIG. 19, the coding apparatus 800 in the fifth embodiment is identical to the coding apparatus in the first embodiment, except for the reference-picture modification unit 801. When the reference-picture modification unit 801 receives frame and block numbers from the error-signal receiving unit 106, as the reference frame to be modified, it selects the frame immediately preceding the next frame to be coded, uses information read from the reference-relationship memory 108 to identify all error propagation blocks in this reference frame, and replaces each error propagation block in the reference frame, which is stored in the reference-picture memory 105, with the most recent corresponding block that is neither an error block nor an error propagation block. These corresponding blocks are stored in one or more previous frames in the reference-picture memory 105. After performing these replacements, the reference-picture modification unit 801 notifies the end-information generator 109, which generates end-of-modification information.

Figure 20:
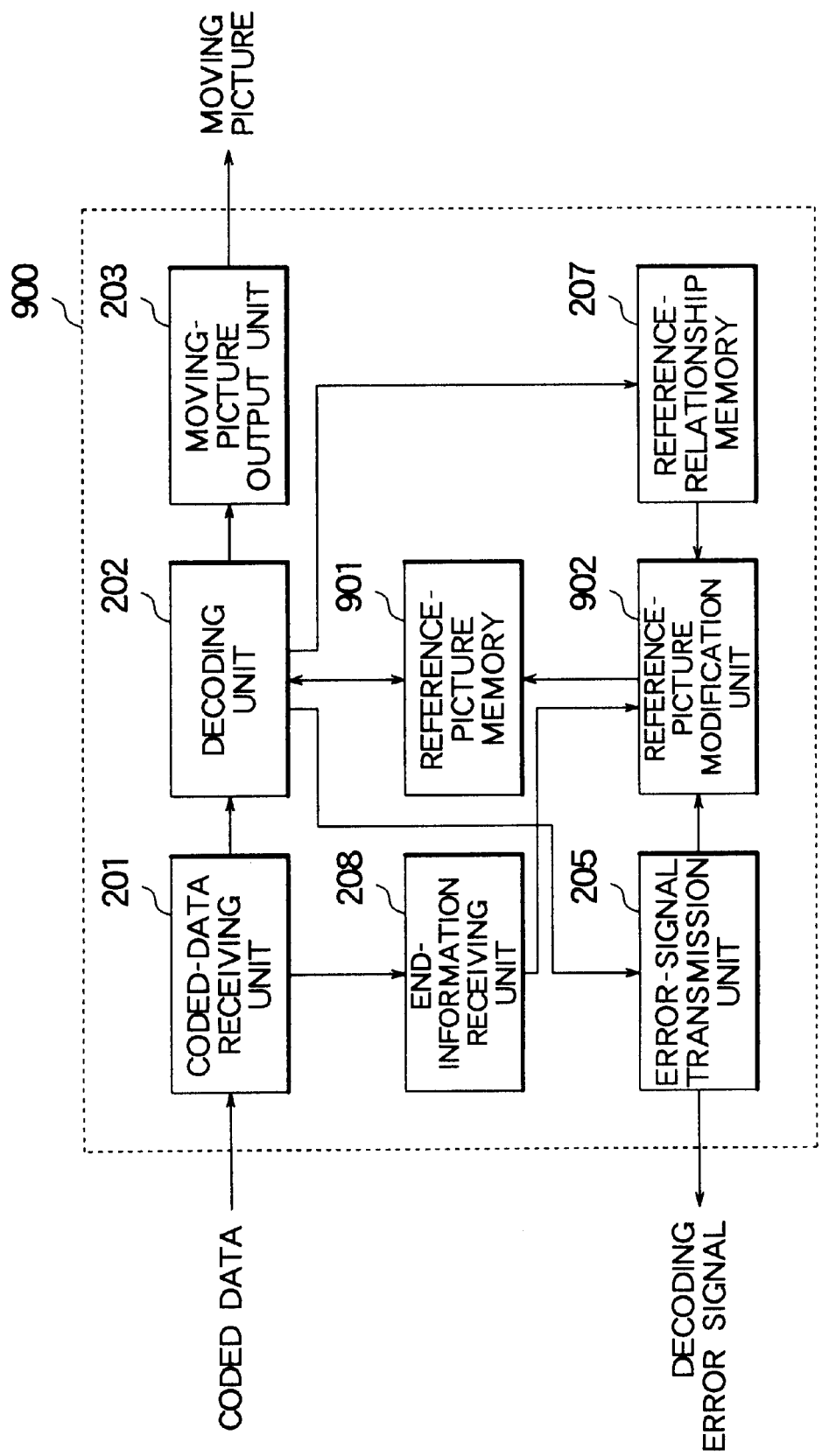
FIG. 20 is a block diagram of the decoding apparatus in the fifth embodiment.

Referring to FIG. 20, the decoding apparatus 900 in the fifth embodiment differs from the decoding apparatus in the first embodiment in regard to the reference-picture memory 901 and reference-picture modification unit 902.

The reference-picture memory 901 stores a plurality of decoded frames, preferably the same number as stored in the reference-picture memory 204 in the coding apparatus 800.

The reference-picture modification unit 902, upon receiving end-of-modification information from the end-information receiving unit 208, performs the same single-frame modification as performed by the reference-picture modification unit 801 in the coding apparatus 800, using information supplied by the error-signal transmission unit 205 and reference-relationship memory 207 and the previous frame data still stored in the reference-picture memory 901. Each error propagation block in the most recent frame stored in the reference-picture memory 901 is replaced with the most a corresponding previous block that is not an error block or error propagation block.

Figure 21:
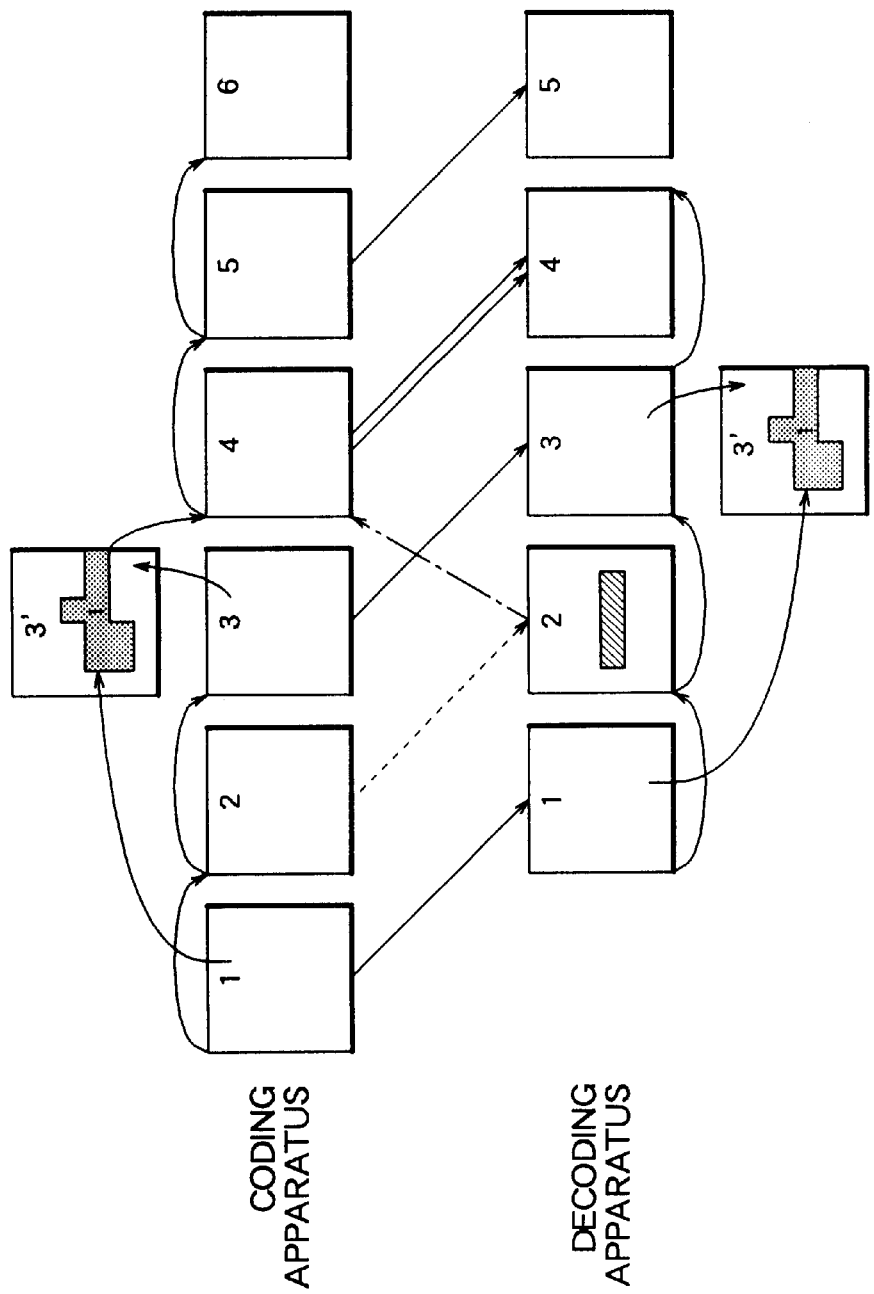
FIG. 21 illustrates the operation of the fifth embodiment.

FIG. 21 illustrates the operation of the fifth embodiment for the case of a transmission error in frame 2. After decoding frame 2 and recognizing the error, the decoding apparatus 900 returns a decoding error signal to the coding apparatus 800. The erroneously decoded frame 2 is stored in the reference-picture memory 901 without modification. Frame 3, when decoded, is likewise stored in the reference-picture memory 901, without deletion of frame 1.

The coding apparatus 800 receives the decoding error signal before coding frame 4. From the information furnished by the error-signal receiving unit 106 and reference-relationship memory 108, the reference-picture modification unit 801 identifies the four error blocks in frame 2 and the eight blocks to which the error propagated in frame 3, and replaces these eight error propagation blocks in frame 3 with data from frame 1. The coding unit 102 codes frame 4 with reference to the resulting modified reference frame 3', and the coded-data transmission unit 103 multiplexes end-of-modification information together with the coded data. Frame 2 is not modified.

When the decoding apparatus 900 receives the end-of-modification information with frame 4, the reference-picture modification unit 902 performs the same modification of frame 3 in the reference-picture memory 901, thereby replacing all erroneously decoded blocks with data from frame 1. Frame 4 is correctly decoded with reference to the resulting modified reference frame 3', which is identical to the modified frame 3' referred to by the coding unit 102 in coding frame 4. Frame 2 is not modified.

The fifth embodiment provides the same effects as the first embodiment, but shortens the modification processing.

In a variation of the fifth embodiment, the decoding apparatus operates as in the first embodiment, the reference-picture memory 204 storing only two frames and the reference-picture modification unit 206 modifying each successive reference frame containing error blocks or error propagation blocks. The coding apparatus makes the same modifications, but modifies only one reference frame, taking replacement data from a plurality of previous frames if necessary. This variation reduces the amount of memory required in the decoding apparatus.

The second, third, fourth, and fifth embodiments have been described as separate enhancements of the first embodiment, but these separate enhancements can be combined to obtain still further embodiments.

The invention can be practiced in hardware-or software, or a combination of both.

Although the above descriptions have included motion compensation, the invention can be practiced in a system that does not employ motion compensation, but simply transmits a series of highly correlated frames, coded by inter-frame coding.

It is not necessary for the coding apparatus to send end-of-modification information to the decoding apparatus. The coding apparatus and decoding apparatus can agree in advance that each transmission error will be corrected in the N-th frame following the error, where N is a suitable positive integer. In the first four embodiments, the coding apparatus and decoding apparatus both stop making modifications at this N-th frame. In the fifth embodiment, all modifications are performed on the N-th frame following the error.

Conversely, the coding apparatus can send the same end-of-modification information to the decoding apparatus continuously, multiplexed together with every frame until the next transmission error occurs. When the decoding apparatus receives the same end-of-modification information repeatedly, it ignores all but the first occurrence of the information. This variation enables recovery to be accomplished even when the end-of-modification information itself is damaged by a transmission error, provided the decoding apparatus is adapted to undo modifications that were not made in the coding apparatus.

Those skilled in the art will recognize that further variations are possible within the scope claimed below.

What is claimed is:

1. A method of recovering from a transmission error in a picture transmission system that transmits a series of pictures from a coding apparatus to a decoding apparatus, each picture in the series being coded at the coding apparatus with reference to a preceding picture in the series, and decoded at the decoding apparatus with reference to the same preceding picture in the series, comprising the steps of:
   (a) detecting a decoding error, caused by said transmission error, at said decoding apparatus;
   (b) transmitting an error signal from said decoding apparatus to said coding apparatus, informing said coding apparatus of said coding error;
   (c) selecting a reference picture in said series of pictures;
   (d) determining a part of said reference picture made undecodable by said decoding error;
   (e) modifying said part of said reference picture in said coding apparatus, thereby obtaining a first modified reference picture;
   (f) identically modifying said part of said reference picture in said decoding apparatus, thereby obtaining a second modified reference picture;
   (g) coding a subsequent picture, following said reference picture in said series, with reference to said first modified reference picture at said coding apparatus; and
   (h) decoding said subsequent picture with reference to said second modified reference picture at said decoding apparatus.

2. The method of claim 1, wherein said step (b) is performed repeatedly.

3. The method of claim 1, wherein said coding apparatus selects said reference picture, further comprising the step of:
   (i) sending information from said coding apparatus to said decoding apparatus, notifying said decoding apparatus that said coding apparatus has modified said reference picture.

4. The method of claim 3, wherein said step (i) is performed repeatedly.

5. The method of claim 1 wherein, in said steps (e) and (f), said part of said reference picture is modified by use of another part of said reference picture.

6. The method of claim 1 wherein, in said steps (e) and (f), said part of said reference picture is modified by use of a corresponding part of a picture preceding said reference picture in said series.

7. The method of claim 1, wherein said step (f) further comprises the steps of:
   (j) modifying a first picture, in which said decoding error occurred, by using data unaffected by said decoding error to replace data affected by said coding error; and
   (k) modifying each picture in said series affected by propagation of said decoding error, by using data unaffected by said decoding error to replace data affected by propagation of said coding error, until said reference picture has been modified.

8. The method of claim 1, wherein said coding apparatus and said decoding apparatus perform motion compensation, using motion vectors, and said step (d) comprises using said motion vectors to determine error propagation.

9. The method of claim 1, wherein said step (d) determines, as said part of said reference picture, all parts of said reference picture affected by said coding error.

10. The method of claim 1, wherein said step (d) determines, as said part of said reference picture, those parts of said reference picture affected to at least a predetermined degree by said coding error.

11. The method of claim 1, wherein said steps (e) and (f) are carried out according to a predetermined modification procedure.

12. The method of claim 1, further comprising the steps of:
(l) selecting a modification procedure for use in said step (f) at said decoding apparatus; and
(m) transmitting information describing said modification procedure from said decoding apparatus to said coding apparatus, for use in said step (e);
said steps (l) and (m) being performed by said decoding apparatus.

13. A picture transmission system comprising:
a coding apparatus receiving a series of pictures, coding each picture in said series with reference to a preceding picture in said series, transmitting resulting coded data on a communication link, receiving from said communication link an error signal specifying a part of one of said pictures in which a decoding error occurred, selecting a picture in said series affected by said decoding error as a reference picture, modifying a part of said reference picture affected by said decoding error to obtain a first modified reference picture, and coding a subsequent picture in said series, following said reference picture, with reference to said first modified reference picture; and
a decoding apparatus receiving said coded data from said communication link, decoding said coded data to reproduce said series of pictures, temporarily storing each decoded picture in said series for reference in decoding a further picture in said series, detecting said decoding error, transmitting said error signal over said communication link to said coding apparatus, selecting the reference picture also selected by said coding apparatus, modifying said part of said reference picture after decoding said reference picture, as said reference picture was modified by said coding apparatus, thereby obtaining a second modified reference picture, and decoding said subsequent picture with reference to said second modified reference picture.

14. The picture transmission system of claim 13, wherein said decoding apparatus transmits said error signal to said coding apparatus repeatedly.

15. The picture transmission of claim 14, wherein said coding apparatus, after receiving said error signal once, ignores further repetitions of said error signal.

16. The picture transmission system of claim 13, wherein said coding apparatus sends information to said decoding apparatus, notifying said decoding apparatus that said coding apparatus has modified said reference picture, and said decoding apparatus selects said reference picture according to the information received from said coding apparatus.

17. The picture transmission system of claim 16, wherein said coding apparatus sends said information to said decoding apparatus repeatedly.

18. The picture transmission of claim 17, wherein said decoding apparatus, after receiving said information once, ignores further repetitions of said information.

19. The picture transmission system of claim 13, wherein said coding apparatus and said decoding apparatus both modify said part of said reference picture by using another part of said reference picture.

20. The picture transmission system of claim 13, wherein said coding apparatus and said decoding apparatus both modify said part of said reference picture by using a corresponding part of a picture preceding said reference picture in said series.

21. The picture transmission system of claim 13, wherein said decoding error occurs in a first picture previous to said reference picture in said series.

22. The picture transmission system of claim 21, wherein said decoding apparatus, after decoding said first picture to obtain a first decoded picture, modifies said first decoded picture by using data unaffected by said decoding error to replace data affected by said coding error, then modifies each further decoded picture in said series affected by propagation of said decoding error, by using data unaffected by said decoding error to replace data affected by propagation of said coding error, until said reference picture has been modified.

23. The picture transmission system of claim 22, wherein said coding apparatus temporarily stores a plurality of said pictures, from said first picture to said reference picture, and modifies said plurality of pictures one by one, replacing the same data as replaced in said decoding apparatus.

24. The picture transmission system of claim 21, wherein said coding apparatus temporarily stores a plurality of said pictures from said first picture to said reference picture, and modifies said reference picture without modifying any picture preceding said reference picture among said plurality of pictures.

25. The picture transmission system of claim 21, wherein said decoding apparatus also performs error concealment on each said decoded picture from the decoded picture in which said decoding error occurred until modification of said reference picture.

26. The picture transmission system of claim 25, wherein said decoding apparatus has a first memory storing each said decoded picture before said error concealment is performed on said decoded picture, has a second memory storing each said decoded picture after said error concealment is carried out on said decoded picture, decodes each picture in said series with respect to a decoded picture stored in said second memory, and copies the modified part of said second modified reference picture from said first memory to said second memory.

27. The picture transmission system of claim 13, wherein said coding apparatus and said decoding apparatus perform motion compensation, using motion vectors, and use said motion vectors to determine the part of said reference picture affected by said decoding error.

28. The picture transmission system of claim 13, wherein said part of said reference picture includes all parts of said reference picture affected by said coding error.

29. The picture transmission system of claim 13, wherein said part of said reference picture includes only those parts of said reference picture affected to at least a predetermined degree by said coding error.

30. The picture transmission system of claim 13, wherein said coding apparatus and said decoding apparatus both modify said reference picture according to a predetermined modification procedure.

31. The picture transmission system of claim 13, wherein said decoding apparatus selects a procedure for modifying said reference picture, and transmits information describing said procedure to said coding apparatus.

32. A coding apparatus as described in claim 13, comprising:

a coding unit for coding said pictures;

a reference-picture memory coupled to said coding unit, storing a plurality of pictures already coded by said coding unit;

an error-signal receiving unit receiving said error signal; and a reference-picture modification unit coupled to said reference-picture memory and said error-signal receiving unit, modifying said reference picture in said reference-picture memory.

33. The coding apparatus of claim 32, wherein said reference-picture modification unit determines said part of said reference picture by taking error propagation into consideration.

34. The coding apparatus of claim 32, wherein said reference-picture modification unit modifies said part of said one of said pictures in which said decoding error occurred, then modifies pictures stored subsequently in said reference-picture memory in sequence from said one of said pictures to said reference pictures, in each case modifying those parts that were coded with reference to any already modified part of an already modified picture from said one of said pictures to said reference pictures.

35. The coding apparatus of claim 32, wherein said reference-picture modification unit modifies said reference picture by replacing data affected by said decoding error with data from said reference picture not affected by said decoding error.

36. The coding apparatus of claim 32, wherein said reference-picture modification unit modifies said reference picture by replacing data affected by said decoding error with data taken from a previous one of the pictures stored in said reference-picture memory.

37. The coding apparatus of claim 32, wherein said reference-picture modification unit receives instructions from said decoding apparatus specifying a procedure by which said reference picture is to be modified.

38. The coding apparatus of claim 32, further comprising an end-information generator notifying said decoding apparatus when said reference-picture modification unit has finished modifying said reference picture.

39. The coding apparatus of claim 38, wherein said end-information generator notifies said decoding apparatus separately in reply to each error signal received from said decoding apparatus.

40. The coding apparatus of claim 38, wherein said end-information generator notifies said decoding apparatus collectively of completion of modifications of said reference picture made in response to reception of a plurality of error signals specifying decoding errors.

41. The coding apparatus of claim 38, wherein said end-information generator 109) notifies said decoding apparatus repeatedly that said reference-picture modification unit has finished modifying said reference picture.

42. The coding apparatus of claim 32, wherein said reference-picture modification unit ignores said error signal if said reference-picture modification unit has already received an identical error signal from said decoding apparatus.

43. The coding apparatus of claim 32, further comprising a reference-relationship memory storing information indicating reference relationships used in coding said pictures, wherein:

said reference-picture modification unit refers to the information stored in said reference-relationship memory.

44. The coding apparatus of claim 32, further comprising an error propagation decision unit determining which parts of said reference picture have been affected by said decoding error by distinguishing between major error propagation effects and minor error propagation effects, and giving the major error propagation effects greater priority than the minor error propagation effects.

45. A decoding apparatus as described in claim 13, comprising:

a decoding unit decoding said coded data and detecting. said decoding error;

a error-signal transmission unit coupled to said decoding unit, transmitting said error signal to said coding apparatus;

a reference-picture memory coupled to said decoding unit, temporarily storing each picture decoded by said decoding unit for reference in subsequent decoding; and a reference-picture modification unit coupled to said reference-picture memory, modifying said reference picture in said reference-picture memory.

46. The decoding apparatus of claim 45, wherein said reference-picture modification unit determines said part of said reference picture by taking error propagation into consideration.

47. The decoding apparatus of claim 45, wherein said reference-picture modification unit modifies said reference picture by replacing data affected by said decoding error with data from said reference picture not affected by said decoding error.

48. The decoding apparatus of claim 45, wherein said reference-picture modification unit modifies said reference picture by replacing data affected by said decoding error with data taken from a previous one of the pictures in said series.

49. The decoding apparatus of claim 45, wherein said error-signal transmission unit also sends said coding apparatus information describing a procedure by which said reference-picture modification unit modifies reference picture.

50. The decoding apparatus of claim 45, further comprising an end-information receiving unit receiving information from said coding apparatus indicating that said coding apparatus has modified said reference picture, wherein said reference-picture modification unit modifies each decoded picture stored in said reference-picture memory from detection of said decoding error until said end-information receiving unit 208 receives said information from said coding apparatus.

51. The decoding apparatus of claim 50, wherein said reference-picture modification unit interprets the information received by said end-information receiving unit as applying both to said decoding error and to any decoding error, detected before said decoding error, for which said end-information receiving unit has not received information from said coding apparatus.

52. The decoding apparatus of claim 50, wherein said end-information receiving unit, after receiving said information once from said coding apparatus, ignores identical information received later from said coding apparatus.

53. The decoding apparatus of claim 45, wherein said error-signal transmission unit sends said error signal to said coding apparatus repeatedly.

54. The decoding apparatus of claim 45, further comprising a reference-relationship memort storing information indicating reference relationships used in decoding said coded data, wherein said reference-picture modification unit refers to the information stored in said reference-relationship memory.

55. The decoding apparatus of claim 45, further comprising an error propagation decision unit determining which parts of said reference picture have been affected by said decoding error by distinguishing between major error propagation effects and minor error propagation effects, and giving the major error propagation effects greater priority than the minor error propagation effects.

56. The decoding apparatus of claim 45, further comprising an error concealment unit performing error concealment in the pictures decoded by said decoding unit from detection of said decoding error until said reference picture is modified.

57. The decoding apparatus of claim 56, further comprising a concealed-error reference-picture memory storing the pictures processed by said error concealment unit, wherein said decoding unit refers to the pictures stored in said concealed-error reference-picture memory, and said reference-picture modification unit copies modified parts of said second modified reference picture from said reference-picture memory to said concealed-error reference-picture memory.

* * * * *